US012761580B2

(12) United States Patent
Ooyoshi

(10) Patent No.: US 12,761,580 B2
(45) Date of Patent: Oct. 13, 2026

(54) IMAGE FORMING DEVICE AND METHOD FOR FORMING COLOR IMAGE HAVING BRILLIANCE

(71) Applicant: Oki Electric Industry Co., Ltd., Tokyo (JP)

(72) Inventor: Taiga Ooyoshi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/770,165

(22) Filed: Jul. 11, 2024

(65) Prior Publication Data

US 2025/0068098 A1 Feb. 27, 2025

(30) Foreign Application Priority Data

Aug. 22, 2023 (JP) ................................ 2023-134850

(51) Int. Cl.
*G03G 15/00* (2006.01)
*G03G 15/01* (2006.01)
*G03G 15/08* (2006.01)

(52) U.S. Cl.
CPC ..... *G03G 15/0875* (2013.01); *G03G 15/0178* (2013.01); *G03G 15/5041* (2013.01); *G03G 15/6582* (2013.01); *G03G 15/6585* (2013.01); *G03G 15/556* (2013.01); *G03G 2215/00755* (2013.01)

(58) Field of Classification Search
CPC .......... G03G 15/0875; G03G 15/5041; G03G 2215/00755; G03G 15/50; G03G 15/0189; G03G 15/0178; G03G 15/043; G03G 15/6585; G03G 15/556; G03G 2215/00059; G03G 15/0856; G03G 15/6582; G03G 13/0135; G03G 9/0926; H04N 1/54
See application file for complete search history.

(56) References Cited

U.S. PATENT DOCUMENTS

2003/0027062 A1* 2/2003 Bhattacharya ......... G03G 13/01 430/18
2012/0229819 A1* 9/2012 Koyatsu ............. G03G 15/0126 358/1.1
2014/0043623 A1* 2/2014 Koyatsu ............. G03G 15/0121 358/1.1
2024/0210846 A1 6/2024 Hasegawa

FOREIGN PATENT DOCUMENTS

JP 2019-113783 A 7/2019
JP 2024087467 A 7/2024

* cited by examiner

*Primary Examiner* — Stephanie E Bloss
*Assistant Examiner* — Laura Roth
(74) *Attorney, Agent, or Firm* — Rabin & Berdo, P.C.

(57) ABSTRACT

An image forming device includes a brilliant image forming section, a non-brilliant image forming section, and a control section. When an image is formed on a medium by superimposing a brilliant image with an image density of 100% on a non-brilliant image, the control section controls the brilliant image forming section and the non-brilliant image forming section so as to make them form the brilliant image whose image density is a first image density if saturation of the non-brilliant image is first saturation and make them form the brilliant image whose image density is a second image density lower than the first image density if the saturation of the non-brilliant image is second saturation higher than the first saturation.

11 Claims, 15 Drawing Sheets

| COLOR OF COLOR TONER IMAGE | CYAN | | | MAGENTA | | | YELLOW | | |
|---|---|---|---|---|---|---|---|---|---|
| IMAGE DENSITY [%] OF SILVER TONER IMAGE | 100 | 50 | 25 | 100 | 50 | 25 | 100 | 50 | 25 |
| FI VALUE | 11.3 | 10.4 | 9.4 | 11.1 | 11.0 | 10.4 | 8.9 | 8.2 | 6.7 |
| C* | 24.5 | 34.7 | 49.1 | 16.6 | 28.5 | 49.9 | 21.1 | 35.6 | 63.2 |
| C* RETENTION RATE [%] | 41 | 58 | 82 | 23 | 39 | 68 | 23 | 38 | 67 |

FIG. 7A
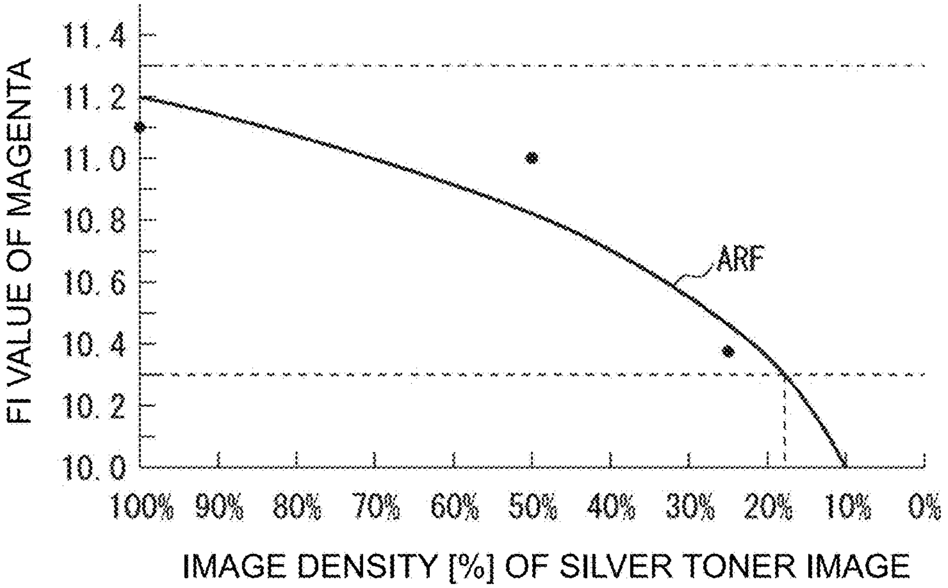
FIG. 7B
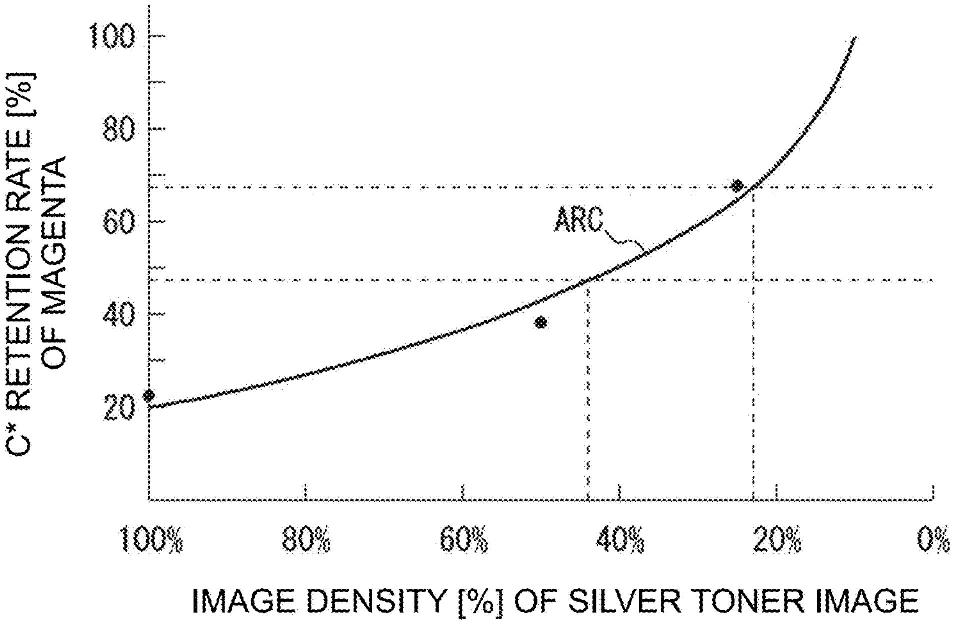
FIG. 8
TBL2
| | CYAN | MAGENTA | YELLOW | SILVER |
|---|---|---|---|---|
| C* | 60.0 | 73.2 | 93.6 | 1.9 |
| ΔC* | 58.1 | 71.3 | 91.7 | - |
| ΔE | 81.3 | 89.0 | 128.9 | 73.4 |
| ΔE* | 8.0 | 15.6 | 55.5 | - |

FIG.11A

TBL3

| | PRINT PATTERN N | | | | |
|---|---|---|---|---|---|
| DOT COUNT d | 0≦d<1661k | 1661k≦d<3344k | 3344k≦d<5127k | 5127k≦d<8564k | 8564k≦d<9863k |
| EXAMPLE X1C | NC2 | NC3 | NC4 | NC4 | NC4 |
| COMPARATIVE EXAMPLE Z1C | NC1 | NC1 | NC1 | NC1 | NC1 |
| COMPARATIVE EXAMPLE Z2C | NC2 | NC2 | NC2 | NC2 | NC2 |

FIG.11B

TBL4

| | PRINT PATTERN N | | | | | |
|---|---|---|---|---|---|---|
| DOT COUNT d | 0≦d<1660k | 1660k≦d<3232k | 3232k≦d<4934k | 4934k≦d<6929k | 6929k≦d<8589k | 8589k≦d<11771k |
| EXAMPLE X2M | NM3 | NM4 | NM5 | NM5 | NM5 | NM6 |
| EXAMPLE X3Y | NM3 | NM4 | NM5 | NM5 | NM6 | NM6 |
| COMPARATIVE EXAMPLE Z3M | NM1 | NM1 | NM1 | NM1 | NM1 | NM1 |
| COMPARATIVE EXAMPLE Z4M | NM3 | NM3 | NM3 | NM3 | NM3 | NM3 |
| COMPARATIVE EXAMPLE Z5Y | NM1 | NM1 | NM1 | NM1 | NM1 | NM1 |
| COMPARATIVE EXAMPLE Z6Y | NM3 | NM3 | NM3 | NM3 | NM3 | NM3 |

FIG.12A

TBL5

| | FI VALUE | | | | | | |
|---|---|---|---|---|---|---|---|
| DOT COUNT d | 0 | 1661k | 3344k | 5127k | 8564k | 9863k | STANDARD DEVIATION |
| EXAMPLE X1C | 10.8 | 10.4 | 10.4 | 10.3 | 10.3 | 10.7 | 0.20 |
| COMPARATIVE EXAMPLE Z1C | 10.3 | 10.6 | 11.0 | 11.2 | 11.0 | 11.1 | 0.31 |
| COMPARATIVE EXAMPLE Z2C | 10.8 | 11.1 | 11.0 | 11.4 | 11.0 | 11.0 | 0.18 |

FIG.12B

TBL6

| | C* | | | | | | |
|---|---|---|---|---|---|---|---|
| DOT COUNT d | 0 | 1661k | 3344k | 5127k | 8564k | 9863k | STANDARD DEVIATION |
| EXAMPLE X1C | 34.0 | 34.8 | 31.2 | 29.8 | 30.4 | 30.3 | 1.93 |
| COMPARATIVE EXAMPLE Z1C | 24.5 | 24.2 | 23.1 | 22.8 | 19.3 | 19.8 | 2.02 |
| COMPARATIVE EXAMPLE Z2C | 34.0 | 31.9 | 26.9 | 25.4 | 28.2 | 26.8 | 3.06 |

FIG.12C

TBL7

| | FI VALUE | | | | | | | |
|---|---|---|---|---|---|---|---|---|
| DOT COUNT d | 0 | 1660k | 3232k | 4934k | 6929k | 8589k | 11771k | STANDARD DEVIATION |
| EXAMPLE X2M | 10.4 | 10.2 | 10.3 | 10.4 | 10.3 | 10.1 | 10.2 | 0.10 |
| EXAMPLE X3Y | 6.7 | 7.0 | 7.3 | 7.2 | 7.3 | 7.4 | 7.4 | 0.24 |
| COMPARATIVE EXAMPLE Z3M | 11.1 | 11.0 | 11.3 | 11.3 | 11.1 | 11.3 | 11.6 | 0.21 |
| COMPARATIVE EXAMPLE Z4M | 10.4 | 10.7 | 11.2 | 11.5 | 11.3 | 11.4 | 11.6 | 0.41 |
| COMPARATIVE EXAMPLE Z5Y | 8.9 | 9.2 | 9.7 | 9.8 | 9.7 | 9.5 | 9.3 | 0.31 |
| COMPARATIVE EXAMPLE Z6Y | 6.7 | 7.0 | 8.1 | 8.4 | 8.0 | 8.0 | 7.9 | 0.57 |

FIG.12D

TBL8

| | C* | | | | | | | |
|---|---|---|---|---|---|---|---|---|
| DOT COUNT d | 0 | 1660k | 3232k | 4934k | 6929k | 8589k | 11771k | STANDARD DEVIATION |
| EXAMPLE X2M | 49.9 | 48.9 | 40.3 | 38.3 | 37.3 | 37.6 | 37.2 | 5.19 |
| EXAMPLE X3Y | 63.2 | 65.1 | 52.3 | 52.4 | 46.7 | 50.3 | 50.8 | 6.43 |
| COMPARATIVE EXAMPLE Z3M | 16.6 | 16.2 | 13.4 | 13.5 | 12.4 | 12.1 | 12.6 | 1.69 |
| COMPARATIVE EXAMPLE Z4M | 49.9 | 53.1 | 39.7 | 37.2 | 35.8 | 37.4 | 37.1 | 6.50 |
| COMPARATIVE EXAMPLE Z5Y | 21.1 | 22.9 | 16.9 | 19.9 | 18.0 | 18.6 | 16.9 | 2.06 |
| COMPARATIVE EXAMPLE Z6Y | 63.2 | 67.7 | 52.6 | 49.7 | 44.5 | 50.3 | 49.2 | 7.75 |

FIG.13

TBL9

| | C* RETENTION RATE | | | | | | | | | | | | |
|---|---|---|---|---|---|---|---|---|---|---|---|---|---|
| DOT COUNT d | 0 | 1660k | 1661k | 3232k | 3344k | 4934k | 5127k | 6929k | 8564k | 8589k | 9863k | 11771k | ABSOLUTE VALUE |
| EXAMPLE X1C | 57% | – | 58% | – | 52% | – | 50% | – | 51% | – | 51% | – | 53% |
| EXAMPLE X2M | 69% | 69% | – | 56% | – | 53% | – | 52% | – | 54% | – | 52% | 57% |
| EXAMPLE X3Y | 68% | 71% | – | 58% | – | 56% | – | 50% | – | 56% | – | 55% | 58% |

FIG.17

TBL10

| | BLACK | YELLOW | MAGENTA | CYAN |
|---|---|---|---|---|
| L* | 13.10~13.58 | 89.42~91.55 | 35.75~38.32 | 36.32~38.23 |
| a* | 0.05~0.08 | -10.06~-7.56 | 59.97~65.34 | -2.86~2.57 |
| b* | 0.11~0.25 | 105.48~112.91 | -6.40~-0.15 | -51.87~-49.52 |
| C* | 0.14~0.25 | 105.96~113.16 | 58.32~65.34 | 49.59~51.95 |

IMAGE FORMING DEVICE AND METHOD FOR FORMING COLOR IMAGE HAVING BRILLIANCE

BACKGROUND OF THE INVENTION

1. Field of the Invention

The present disclosure relates to an image forming device and an image forming method, such as a device and a method for executing a print process of carrying out the printing by superimposing a brilliant color having brilliance and a normal color on each other, for example.

2. Description of the Related Art

Conventionally, there has been widespread an image forming device that forms (namely, prints) a color image with normal colors on a medium such as a sheet of paper by combining toners of normal colors such as black, magenta, cyan and yellow (hereinafter referred to as “color toners”).

Among such image forming devices, there are image forming devices capable of forming an image having brilliance on a sheet by using toners of colors having the brilliance (hereinafter referred to also as “brilliant colors”) such as silver color and gold color (hereinafter referred to as “brilliant toners”) in addition to the toners of those normal colors. With such an image forming device, high brilliance can be exhibited on the image after the printing by using fine powder made of metal such as aluminum as the pigment in the brilliant toners, for example (see Patent Reference 1: Japanese Patent Application Publication No. 2019-113783 (e.g., FIG. 2)).

As above, with such an image forming device capable of using brilliant toners, various colors having the brilliance (hereinafter referred to also as “metallic colors”) can be expressed by printing an image with a color toner (hereinafter referred to also as a “color toner image”) and an image with a brilliant toner (hereinafter referred to also as a “brilliant toner image”) in superimposition with each other.

However, it has been generally known that the saturation of color changes (decreases) slightly when an image is printed by superimposing a brilliant toner on a color toner, and the degree of the change in the saturation in this case varies depending on the color of the color toner. Therefore, when a brilliant toner image is superimposed on a color toner image including parts in various colors, for example, the degree of the change in the saturation varies depending on the color of each part.

Thus, the image forming devices have a problem in that even though the brilliance is added to the printed image when the image is printed by superimposing a brilliant toner on a color toner, there is a danger of giving an impression different from that of the original image, or a feeling of strangeness, to a user viewing the image due to difference in the color tone of each part.

SUMMARY OF THE INVENTION

An object of the present disclosure is to provide an image forming device and an image forming method capable of forming an image exhibiting the brilliance while maintaining the color tones of the color toner image.

An image forming device of the present disclosure includes a brilliant image forming section capable of forming a brilliant image using a brilliant developing agent on a medium, a non-brilliant image forming section capable of forming a non-brilliant image using a non-brilliant developing agent on the medium, and a control section that controls the brilliant image forming section and the non-brilliant image forming section. When an image is formed on the medium by superimposing the brilliant image with an image density of 100% on the non-brilliant image, the control section controls the brilliant image forming section and the non-brilliant image forming section so as to make them form the brilliant image whose image density is a first image density if saturation of the non-brilliant image is first saturation and make them form the brilliant image whose image density is a second image density lower than the first image density if the saturation of the non-brilliant image is second saturation higher than the first saturation.

An image forming method of the present disclosure includes forming a brilliant image on a medium using a brilliant developing agent, and forming a non-brilliant image on the medium using a non-brilliant developing agent. When the brilliant image and non-brilliant image are formed on the medium by superimposing the brilliant image on the non-brilliant image, the brilliant image whose image density is a first image density is formed if saturation of the non-brilliant image is first saturation, and the brilliant image whose image density is a second image density lower than the first image density is formed if the saturation of the non-brilliant image is second saturation higher than the first saturation.

Another image forming device of the present disclosure includes a brilliant image forming section capable of forming a brilliant image using a brilliant developing agent on a medium, a non-brilliant image forming section capable of forming a non-brilliant image using a non-brilliant developing agent on the medium, and a control section that controls operation of the brilliant image forming section and the non-brilliant image forming section. When an image is formed on the medium by superimposing the brilliant image with an image density of 100% on the non-brilliant image, the control section controls the brilliant image forming section and the non-brilliant image forming section so as to make them form the brilliant image whose image density is a first image density if saturation of the non-brilliant developing agent is first saturation and make them form the brilliant image whose image density is a second image density lower than the first image density if the saturation of the non-brilliant developing agent is second saturation higher than the first saturation.

In the present disclosure, the brilliant image with the first image density is superimposed on the non-brilliant image with the first saturation and the brilliant image with the second image density lower than the first image density is superimposed on the non-brilliant image with the second saturation higher than the first saturation. According to the present disclosure, the image density of the superimposed brilliant image can be varied between a part with the first saturation and a part with the second saturation in the non-brilliant image, and the balance of the brilliance and the saturation can be maintained appropriately before and after the superimposition.

With the image forming device or the image forming method in the present disclosure, an image exhibiting the brilliance can be formed while maintaining the color tones of the non-brilliant image.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIGS. 7A and 7B are graphs showing a relationship among the image density of the silver toner, an FI value and the "C* retention rate" in regard to magenta;

FIG. 8 is a diagram showing a C* value and various calculated values of each color in tabular form;

FIGS. 11A and 11B are diagrams showing a correspondence relationship between a dot count of silver color and the print pattern regarding each color in tabular form;

FIGS. 12A to 12D are diagrams showing the FI value and the C* value of each color corresponding to the dot count of the silver color in evaluation tests in tabular form;

FIG. 13 is a diagram showing the average value of the "C* retention rate" depending on the dot count of the silver color in each example in tabular form;

FIG. 17 is a diagram showing the color gamut of the toner of each color in a powdery state in tabular form.

DETAILED DESCRIPTION OF THE INVENTION

Modes for carrying out the invention (hereinafter referred to as "embodiments") will be described below by using the drawings. The following embodiments are just examples and it is possible to appropriately modify each embodiment.

1. Image Forming Device

Figure 1:
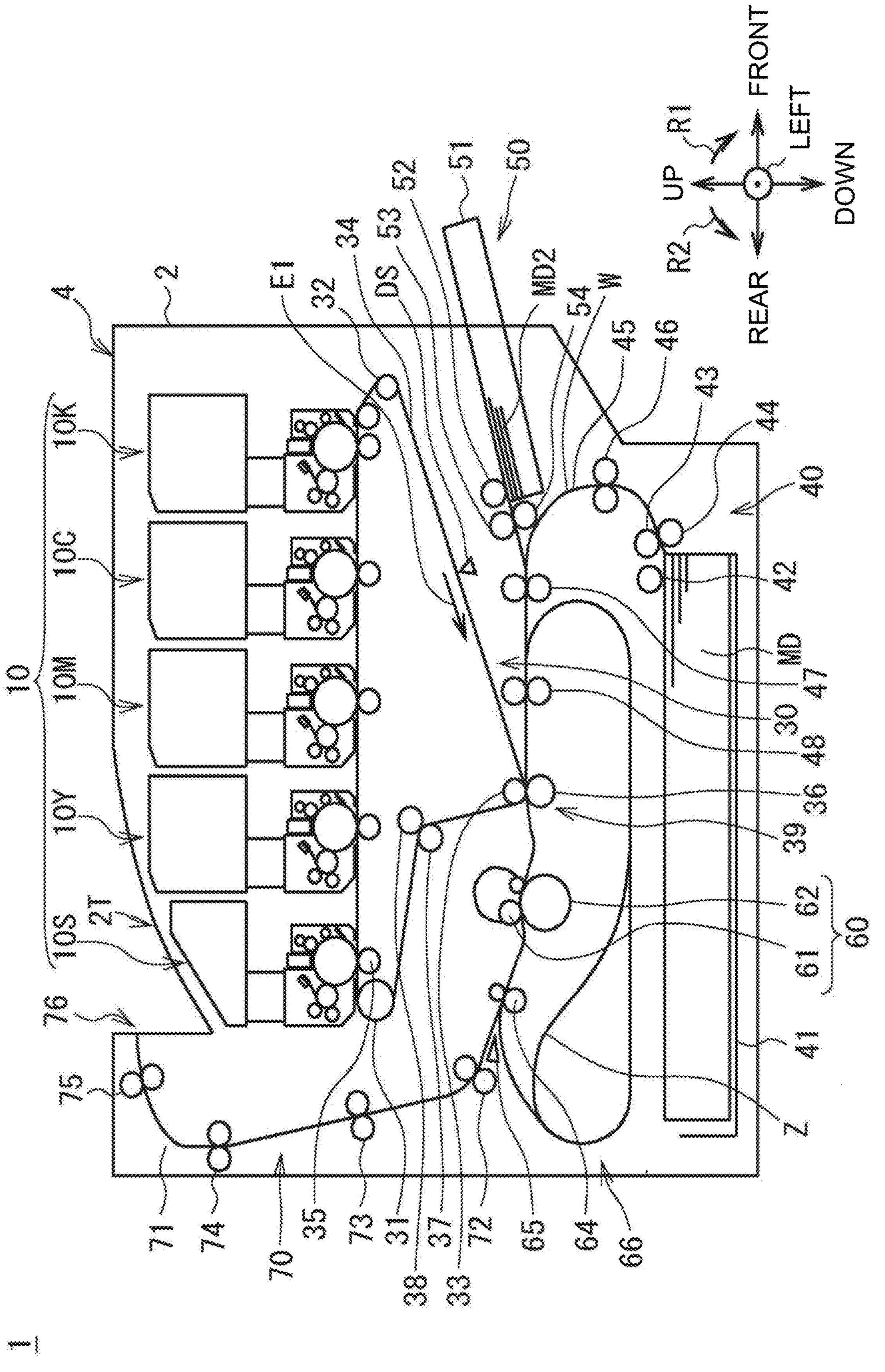
FIG. 1 is a schematic cross-sectional view showing the configuration of an image forming device.

FIG. 1 is a schematic cross-sectional view showing the configuration of an image forming device 1 according to this embodiment. As shown in FIG. 1, the image forming device 1 is a color printer of the electrophotographic type and is capable of forming (namely, printing) a color image on a medium MD such as a sheet of paper. The image forming device 1 in FIG. 1 does not have an image scanner function of scanning a document, a communication function using a telephone line, or the like, and is an SFP (Single Function Printer) having only the printer function as the single function. However, the image forming device 1 is not limited to an SFP.

The image forming device 1 includes various components arranged in a housing 2 formed substantially in a box shape. In the following description, a right end part of the image forming device 1 in FIG. 1 is the front (front part) of the image forming device 1. When directions are expressed in the following description, an up/down direction, a transverse direction (i.e., left/right direction) and a longitudinal direction (i.e., front/rear direction) as the image forming device 1 is viewed from the front will be used. While the image forming device 1 in FIG. 1 primarily transfers toner images formed on image carriers onto an intermediate transfer belt 34 and thereafter secondarily transfers the toner images onto the medium MD, the image forming device 1 can also be an image forming device that transfers the toner images formed on the image carriers directly onto the medium MD.

Figure 3:
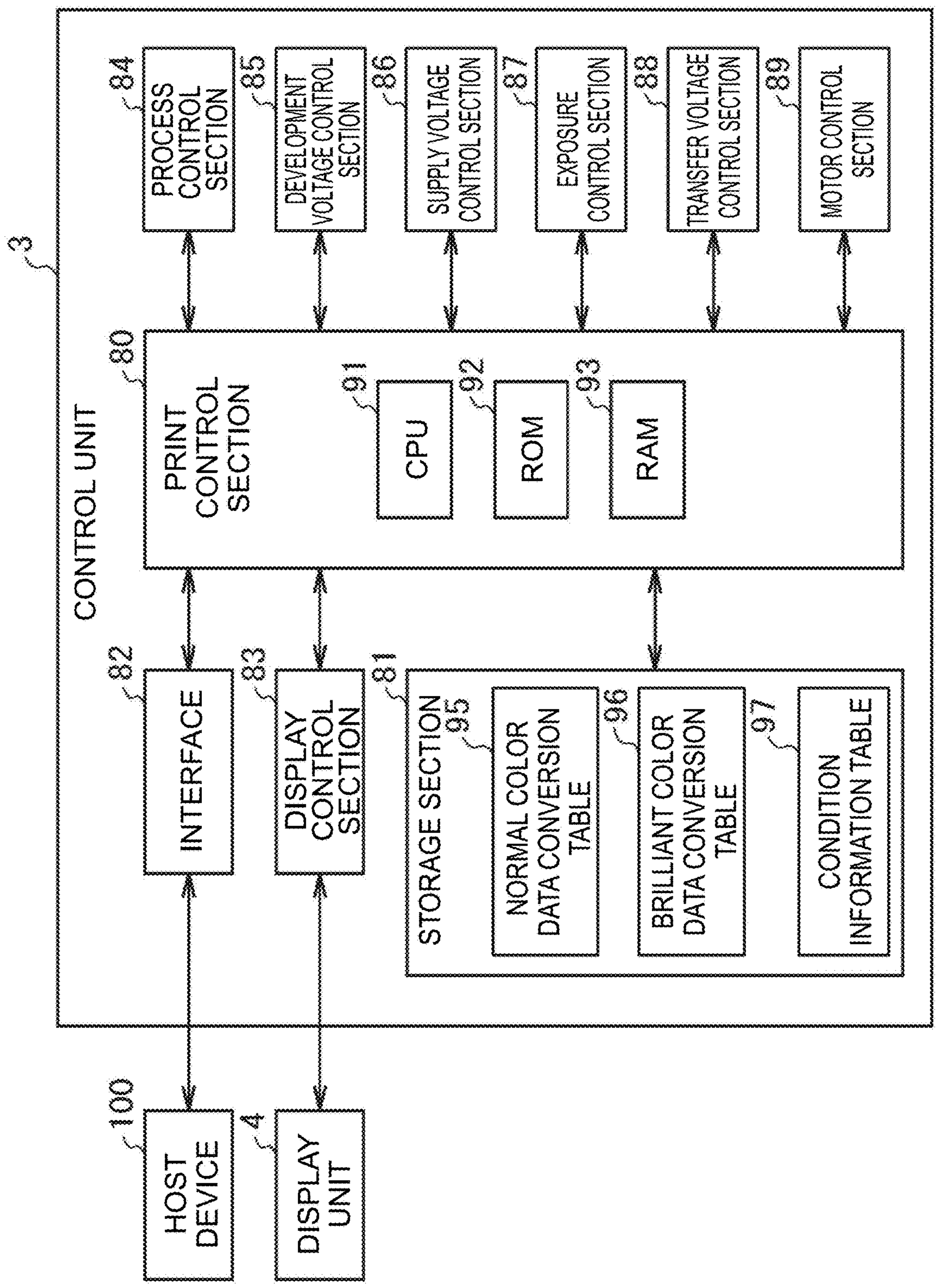
FIG. 3 is a functional block diagram showing the configuration of a control system of the image forming device.

The operation of the image forming device 1 is subject to centralized control by a control section 3 (FIG. 3). The control section 3 executes various processes by reading out and executing predetermined programs as described later. The control section 3 includes, for example, a storage device including a storage medium that stores programs and a processor such as a CPU (Central Processing Unit) that executes the programs. The control section 3 may also be formed with a processing circuit (processing circuitry) that executes desired processes. Further, the control section 3 is connected to a host device 100 (FIG. 3) such as a computer by radio or by wire. The control section 3 executes a print process of forming a print image on the surface of the medium MD when image data representing an image as a print object is provided from the host device 100 and the printing of the image data is commanded. A display section 4 is a display device such as a liquid crystal panel, for example, and is arranged on a front side on an upper surface of the housing 2. The display section 4 displays a variety of information according to control by the control section 3.

On an upper side of a space inside the housing 2, five image forming units 10K, 10C, 10M, 10Y and 10S are arranged in this order from the front side towards a rear side. The image forming units 10K, 10C, 10M, 10Y and 10S correspond respectively to black (K), cyan (C), magenta (M), yellow (Y) and a special color(S). The image forming units 10K, 10C, 10M, 10Y and 10S have the same configuration as each other except for the color of the toner used therein.

Each of black (K), cyan (C), magenta (M) and yellow (Y) is a color used in generic color printers (hereinafter referred to as a "normal color" or a "non-brilliant color"). In contrast, the special color(S) is a special color exhibiting metallic luster, namely, having brilliance, such as gold color or silver color, for example (hereinafter referred to also as a "brilliant color"). The special color(S) can be used either independently or in superimposition on a normal color. In this embodiment, the description will be given by taking an example in which the silver color (silver) is used as an example of the special color(S). For convenience of description, the image forming units 10K, 10C, 10M, 10Y and 10S are hereinafter referred to collectively as "image forming units 10". Further, the image forming units 10K, 10C, 10M and 10Y are hereinafter referred to also as "non-brilliant image forming sections", and the image forming unit 10S is hereinafter referred to also as a "brilliant image forming section".

Figure 2:
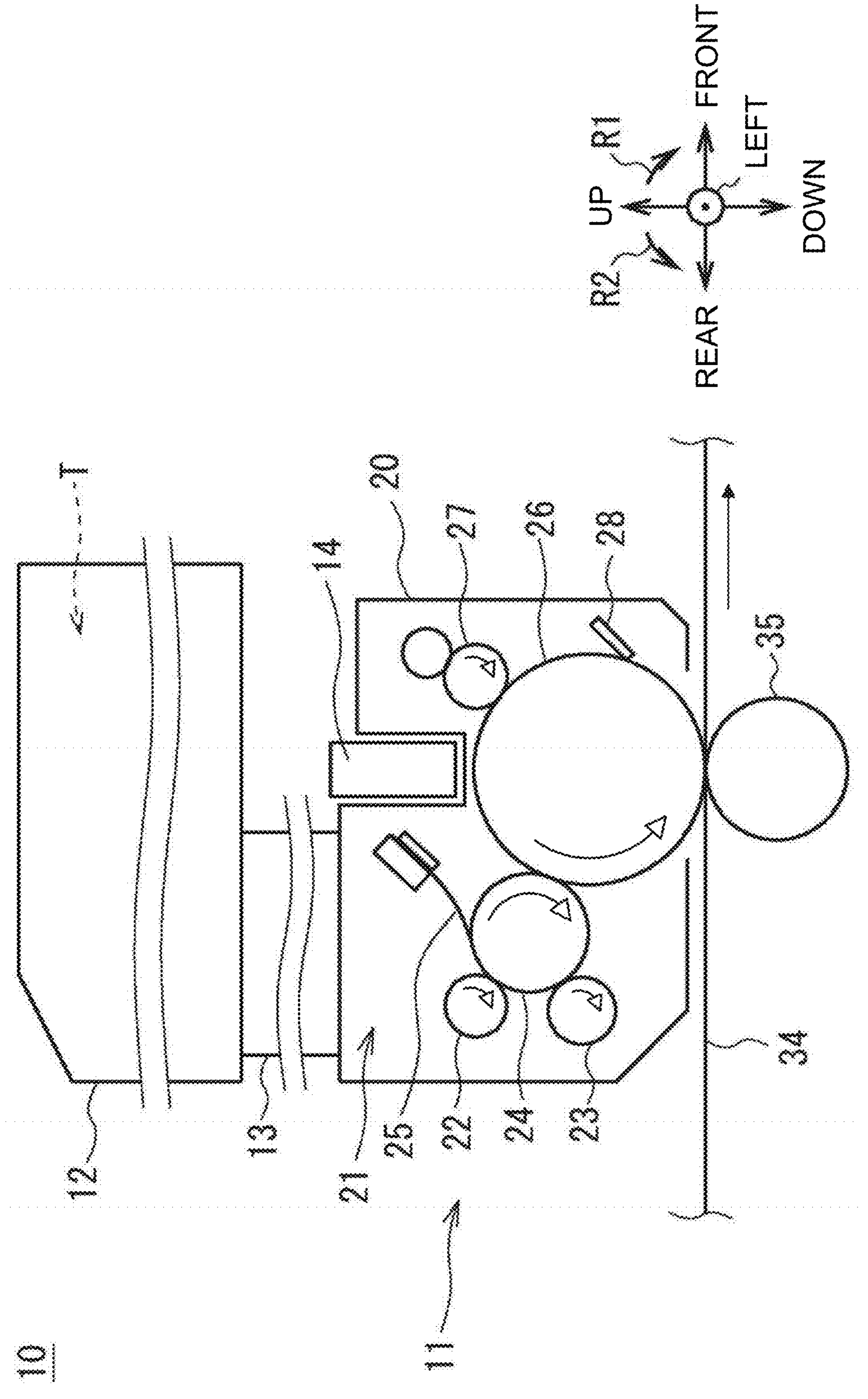
FIG. 2 is a schematic cross-sectional view showing the configuration of an image forming unit.

FIG. 2 is a schematic cross-sectional view showing the configuration of the image forming unit 10. As shown in FIG. 2, the image forming unit 10 is roughly made up of an image formation main unit 11, a toner container 12, a toner supply section 13 and an LED (Light Emitting Diode) head 14. However, the LED head 14 can also be a component separate from the image forming unit 10 (e.g., a component provided in the image forming device 1). The toner container 12 stores a toner T (referred to also as a developing agent) therein and is configured to be attachable and detachable to/from the image forming unit 10 (i.e. to be replaceable). When the toner container 12 is attached to the image forming unit 10, the toner container 12 is attached to the image formation main unit 11 via the toner supply section 13. The toner container 12 is referred to also as a "toner cartridge" or a "developing agent container".

As will be described later, a toner containing a brilliant pigment is used as the toner T of the silver color. For convenience of description, the toner T of the silver color as the brilliant color is hereinafter referred to as a "silver toner TS", a "brilliant toner" or a "brilliant developing agent". Further, the toner container 12 storing the silver toner TS is referred to also as a "brilliant developing agent container".

In contrast, as the toners T of yellow, magenta, cyan and black, toners respectively containing organic-based pigments such as pigment yellow, pigment cyan, pigment magenta and carbon black are used. For convenience of description, the toners T of yellow, magenta, cyan and black (i.e., non-brilliant toners T) are hereinafter referred to also as "color toners TL", "non-brilliant toners" or "non-brilliant developing agents".

The image formation main unit 11 (FIG. 2) includes an image formation housing 20, a toner storage space 21, a first supply roller 22 as a developing agent supply member, a second supply roller 23 as a developing agent supply member, a development roller 24 as a developing agent carrier, a development blade 25 as a developing agent regulatory member, a photosensitive drum 26 as an image carrier, a charging roller 27 as a charging member, and a cleaning blade 28 as a cleaning member. Each of the first supply roller 22, the second supply roller 23, the development roller 24, the photosensitive drum 26 and the charging roller 27 is formed in a cylindrical shape with its central axis extending in the transverse direction (i.e., a direction orthogonal to the sheet on which FIG. 2 is drawn) and is supported rotatably by the image formation housing 20.

The toner T supplied from the toner container 12 via the toner supply section 13 is stored in the toner storage space 21. An elastic layer made of electrically conductive urethane rubber foam or the like is formed at an outer circumferential surface of each of the first supply roller 22 and the second supply roller 23. An elastic layer having elasticity, a surface layer having electrical conductivity, and so forth are formed at an outer circumferential surface of the development roller 24 as the developing agent carrier. The development blade 25 is made of a stainless steel plate with a predetermined thickness, for example, and a part of the development blade 25 slightly deformed elastically is placed in contact with the outer circumferential surface of the development roller 24.

A charge generation layer and a charge transport layer like thin films are successively formed at an outer circumferential surface of the photosensitive drum 26 so that the photosensitive drum 26 can be electrically charged. An outer circumferential surface of the charging roller 27 is coated with an elastic body having electrical conductivity and is placed in contact with the outer circumferential surface of the photosensitive drum 26. The cleaning blade 28 is made of resin in a shape like a thin plate, for example, and a part of the cleaning blade 28 slightly deformed elastically is placed in contact with the outer circumferential surface of the photosensitive drum 26.

The LED head 14 as an exposure section is situated over the photosensitive drum 26 in the image formation main unit 11. The LED head 14 includes a plurality of light emitting element chips linearly arranged in the transverse direction (i.e., the direction orthogonal to the sheet on which FIG. 2 is drawn) and the LED head 14 lights up or extinguishes the light emitting elements in a light emission pattern based on an image data signal supplied from the control section 3 (FIG. 3). However, the exposure section may also be formed with a laser optical system.

The image formation main unit 11 is supplied with driving force from a motor (not shown) as a driving force generation section and thereby rotates the first supply roller 22, the second supply roller 23, the development roller 24 and the charging roller 27 in the direction of the arrow R1 (clockwise in FIG. 2) and rotates the photosensitive drum 26 in the direction of the arrow R2 (counterclockwise in FIG. 2). Further, the image formation main unit 11 electrically charges the first supply roller 22, the second supply roller 23, the development roller 24, the development blade 25 and the charging roller 27 by applying predetermined bias voltages respectively to them based on control by the control section 3 (FIG. 3).

The first supply roller 22 and the second supply roller 23 make the toner T in the toner storage space 21 adhere to their outer circumferential surfaces due to the electrical charging and then make the toner T adhere to the outer circumferential surface of the development roller 24 due to the rotation. An excess toner T is removed from the outer circumferential surface of the development roller 24 by the development blade 25, and the outer circumferential surface with the unremoved toner T adhering thereto like a thin film is placed in contact with the outer circumferential surface of the photosensitive drum 26. The number of the supply rollers is not limited to two.

On the other hand, the charging roller 27 in the charged state makes contact with the photosensitive drum 26 and thereby uniformly charges the outer circumferential surface of the photosensitive drum 26. The LED head 14 successively exposes the photosensitive drum 26 to light by executing an exposure process of emitting light at a predetermined time interval and in the light emission pattern based on the image data signal supplied from the control section 3 (FIG. 3). By this process, an electrostatic latent image is formed successively on the outer circumferential surface of the photosensitive drum 26 at a position in the vicinity of an upper end of the photosensitive drum 26.

Subsequently, the photosensitive drum 26 rotates in the arrow R2 direction, by which the part where the electrostatic latent image has been formed is placed in contact with the development roller 24. Accordingly, the toner T adheres to the outer circumferential surface of the photosensitive drum 26 based on the electrostatic latent image, by which a toner image based on the image data is developed. The photosensitive drum 26 further rotates in the arrow R2 direction and thereby makes the toner image arrive at a position in the vicinity of a lower end of the photosensitive drum 26. For convenience of description, the toner image formed with the silver toner TS having the brilliance is hereinafter referred to also as a "brilliant image" or a "silver toner image PS", and the toner image formed with a color toner TL of a normal color is hereinafter referred to also as a "non-brilliant image" or a "color toner image PL".

As shown in FIG. 1, an intermediate transfer section 30 is arranged below the image forming units 10 in the housing 2. The intermediate transfer section 30 is provided with a drive roller 31, a driven roller 32, a backup roller 33, the intermediate transfer belt 34, five primary transfer rollers 35, a secondary transfer roller 36, and a reverse flection roller 37. Each of the drive roller 31, the driven roller 32, the backup roller 33, the primary transfer rollers 35, the secondary transfer roller 36 and the reverse flection roller 37 is formed in a cylindrical shape with its central axis extending in the transverse direction and is supported rotatably by the housing 2.

The drive roller 31 is arranged on a lower rear side relative to the image forming unit 10S and rotates in the arrow R1 direction when driving force is supplied from a non-illustrated belt motor. The driven roller 32 is arranged on a lower front side relative to the image forming unit 10K. Upper ends of the drive roller 31 and the driven roller 32 are situated at height equivalent to or slightly lower than the lower end of the photosensitive drum 26 (FIG. 2) in each image forming unit 10. The backup roller 33 is arranged on the lower front side relative to the drive roller 31 and on the lower rear side relative to the driven roller 32.

The intermediate transfer belt 34 is formed with high-resistance plastic film as an endless belt, and is stretched to move around the drive roller 31, the driven roller 32 and the backup roller 33. Further, in the intermediate transfer section 30, five primary transfer rollers 35 are arranged under a part of the intermediate transfer belt 34 stretched between the drive roller 31 and the driven roller 32, namely, the five primary transfer rollers 35 are arranged at positions directly below the five image forming units 10 and at positions where they each face the photosensitive drums 26 across the intermediate transfer belt 34. To each of the primary transfer rollers 35, a predetermined bias voltage is applied based on the control by the control section 3.

The secondary transfer roller 36 is placed directly below the backup roller 33 and is pushed towards the backup roller 33. That is, the intermediate transfer section 30 sandwiches the intermediate transfer belt 34 between the secondary transfer roller 36 and the backup roller 33. Further, a predetermined bias voltage is applied to the secondary transfer roller 36. In the following description, the secondary transfer roller 36 and the backup roller 33 are referred to collectively as a secondary transfer section 39.

The reverse flection roller 37 is placed at a position in front of and slightly lower than the drive roller 31 and higher than and slightly to the rear of the backup roller 33, and pushes the intermediate transfer belt 34 in a forward and upward direction. By this, the intermediate transfer belt 34 is maintained in a condition with no slack and with tension acting between rollers. Further, a reverse flection backup roller 38 is provided at a position on an upper front side of the reverse flection roller 37 across the intermediate transfer belt 34.

The intermediate transfer section 30 rotates the drive roller 31 in the arrow R1 direction by the driving force supplied from the belt motor (not shown) as a driving force generation section and thereby makes the intermediate transfer belt 34 travel in a direction along the arrow E1. Further, each primary transfer roller 35 rotates in the arrow R1 direction in the condition with the predetermined bias voltage applied thereto. By this operation, the image forming units 10 are capable of transferring the toner images, each having arrived at the position in the vicinity of the lower end of the outer circumferential surface of the photosensitive drum 26 (FIG. 2), to the intermediate transfer belt 34 so as to successively overlay the toner images of the respective colors. In this case, on the surface of the intermediate transfer belt 34, the toner images of the respective colors are overlaid successively, starting from silver (S) on an upstream side. The intermediate transfer section 30 makes the intermediate transfer belt 34 travel and thereby causes the toner images transferred from the image forming units 10 to arrive at a position in the vicinity of the backup roller 33.

As shown in FIG. 1, a conveyance path W as a path for conveying the medium MD is formed inside the housing 2. This conveyance path W extends in a forward and upward direction from a lowermost and relatively front position in the space inside the housing 2, makes approximately a half turn, and thereafter guides the medium rearward below the intermediate transfer section 30. Subsequently, the conveyance path W extends to travel upward on the rear side of the intermediate transfer section 30 and the image forming unit 10S, and thereafter extends forward. In other words, the conveyance path W is formed to draw some shape like the character "S" in FIG. 1. Inside the housing 2, various components are arranged along this conveyance path W.

A first sheet feed section 40 is arranged in the vicinity of a lower end of the space inside the housing 2 (FIG. 1). The first sheet feed section 40 is provided with a sheet cassette 41, a pickup roller 42, a feed roller 43, a retard roller 44, a conveyance guide 45, conveyance roller pairs 46, 47 and 48, and so forth. Each roller included in the pickup roller 42, the feed roller 43, the retard roller 44 and the conveyance roller pairs 46, 47 and 48 is formed in a cylindrical shape with its central axis extending in the transverse direction.

The sheet cassette 41 is formed in a shape like a hollow rectangular prism and is configured to be attachable and detachable to/from the housing 2. The sheet cassette 41 stores the media MD in a state of being overlaid on each other with their surfaces facing the up/down direction, namely, in a stacked state. Further, in this embodiment, a so-called OHP (Overhead Projector) film, specifically, CG3700 (manufactured by 3M Japan Limited), for example, is used as the medium MD. The medium MD is a so-called transparent film-like member having sufficiently high transmittance for visible light.

The pickup roller 42 is placed in contact with a part of an uppermost surface of the media MD stored in the sheet cassette 41 in the vicinity of a front edge of the uppermost surface. The feed roller 43 is arranged in front of and slightly separate from the pickup roller 42. The retard roller 44 is placed below the feed roller 43 and there is a gap equal to the thickness of one medium MD formed between the retard roller 44 and the feed roller 43.

When driving force is supplied from a non-illustrated sheet feed motor, the first sheet feed section 40 appropriately rotates or stops the pickup roller 42, the feed roller 43 and the retard roller 44. Accordingly, the pickup roller 42 sends out one or more uppermost media MD, among the media MD stored in the sheet cassette 41, forward. The feed roller 43 and the retard roller 44 send out one uppermost medium MD among the media MD further forward while blocking second and lower media MD. As above, the first sheet feed section 40 successively sends out the media MD forward while separating one medium MD from the stack of media MD each time.

The conveyance guide 45 is arranged in a lower front part of the conveyance path W and makes the medium MD travel in a forward and upward direction and then in a rearward and upward direction along the conveyance path W. The conveyance roller pairs 46 and 47 are respectively arranged in the vicinity of a center and an upper end of the conveyance guide 45, supplied with driving force from the non-illustrated sheet feed motor, and rotate in predetermined directions. By the rotation, the conveyance roller pairs 46 and 47 make the medium MD travel along the conveyance path W.

Further, a second sheet feed section 50 is provided on the front side of the conveyance roller pair 47 in the housing 2. The second sheet feed section 50 is provided with a sheet tray 51, a pickup roller 52, a feed roller 53, a retard roller 54 and so forth. The sheet tray 51 is formed in a shape like a plate being thin in the up/down direction and is configured to let media MD2 be set thereon. The media MD2, different from the media MD stored in the sheet cassette 41 in size and sheet quality, for example, are set on the sheet tray 51.

The pickup roller 52, the feed roller 53 and the retard roller 54 are respectively configured similarly to the pickup roller 42, the feed roller 43 and the retard roller 44 in the first sheet feed section 40. When driving force is supplied from a non-illustrated sheet feed motor, the second sheet feed section 50 appropriately rotates or stops the pickup roller 52, the feed roller 53 and the retard roller 54 and thereby sends out one uppermost medium MD2 among the media MD2 on the sheet tray 51 rearward while blocking second and lower media MD2. As above, the second sheet feed section 50 successively sends out the media MD2 rearward while separating one medium MD2 from the stack of media MD2 each time. In this case, the medium MD2 sent out is conveyed by the conveyance roller pair 47 along the conveyance path in the same way as the medium MD. For convenience of description, the medium MD2 is hereinafter referred to simply as the medium MD without distinguishing the medium MD2 from the medium MD.

The conveyance roller pair 47, which is appropriately inhibited from rotating, applies frictional force to the medium MD and thereby corrects the so-called skewing, that is, inclination of a side edge of the medium MD with respect to the traveling direction, sets the medium MD in a state in which its edges at its head end and tail end are oriented in the transverse direction, and thereafter sends out the medium MD rearward. The conveyance roller pair 48 is situated at a position separate rearward from the conveyance roller pair 47 by predetermined spacing, rotates similarly to the conveyance roller pair 46 and the like, and thereby supplies driving force to the medium MD conveyed along the conveyance path W and makes the medium MD travel further rearward along the conveyance path W.

The secondary transfer section 39, i.e., the backup roller 33 and the secondary transfer roller 36 of the intermediate transfer section 30 described earlier is arranged to the rear of the conveyance roller pair 48. The toner images formed in the image forming units 10 and transferred to the intermediate transfer belt 34 approach the secondary transfer section 39 due to the traveling of the intermediate transfer belt 34, and the predetermined bias voltage is applied to the secondary transfer roller 36. Accordingly, the secondary transfer section 39 transfers the toner images from the intermediate transfer belt 34 onto the medium MD conveyed thereto along the conveyance path W, and makes the medium MD travel further rearward.

A fixing device 60 is arranged at the rear of the secondary transfer section 39. The fixing device 60 includes a heating part 61 and a pressing part 62 arranged to face each other across the conveyance path W. In the heating part 61, a heater for emitting heat, a plurality of rollers and so forth are arranged inside a heating belt made of a hollow endless belt. The pressing part 62 is formed as a pressing roller in a cylindrical shape with its central axis extending in the transverse direction, and presses its top surface against a bottom surface of the heating part 61 to form a nip part.

According to the control by the control section 3, the fixing device 60 heats the heater of the heating part 61 up to a predetermined temperature, makes the heating belt travel so as to rotate in the arrow R1 direction by appropriately rotating the rollers, and rotates the pressing part 62 in the arrow R2 direction. Then, upon receiving the medium MD onto which the toner images have been transferred by the secondary transfer section 39, the fixing device 60 sandwiches (i.e., nips) the medium MD between the heating part 61 and the pressing part 62, fixes the toner images on the medium MD by applying heat and pressure to the toner images, and sends out the medium MD rearward.

A conveyance roller pair 64 is arranged at the rear of the fixing device 60, and a switching section 65 is arranged at the rear of the conveyance roller pair 64. The switching section 65 switches the traveling direction of the medium MD to an upper side or a lower side according to the control by the control section 3. A sheet ejection section 70 is provided above the switching section 65. The sheet ejection section 70 is made up of a conveyance guide 71 that guides the medium MD upward along the conveyance path W, conveyance roller pairs 72, 73, 74, 75, etc. respectively facing each other across the conveyance path W, and an outlet port 76.

Further, a reconveyance section 66 is arranged below the switching section 65, the fixing device 60, the secondary transfer section 39, etc. The reconveyance section 66 includes a conveyance guide, a conveyance roller pair (not shown) and so forth forming a reconveyance path Z. The reconveyance path Z extends downward from the lower side of the switching section 65, eventually extends forward, and thereafter merges with the conveyance path W on a downstream side of the conveyance roller pair 47.

When ejecting the medium MD, the control section 3 (FIG. 3) makes the switching section 65 switch the traveling direction of the medium MD to the sheet ejection section 70 as the upper side. The sheet ejection section 70 conveys upward the medium MD received from the switching section 65 and ejects the medium MD onto a sheet ejection tray 2T through the outlet port 76. When returning the medium MD while flipping over the medium MD, the control section 3 makes the switching section 65 switch the traveling direction of the medium MD to the reconveyance section 66 as the lower side. The reconveyance section 66 conveys the medium MD received from the switching section 65 to the reconveyance path Z, eventually makes the medium MD reach the downstream side of the conveyance roller pair 47, and has the medium MD conveyed along the conveyance path W again. By this operation, in the image forming device 1, the medium MD with its surfaces flipped over is returned to the conveyance path W, by which the so-called double-side printing can be executed.

As above, in the image forming device 1, the toner images by use of the toners T are formed in the image forming units 10, transferred onto the intermediate transfer belt 34, transferred from the intermediate transfer belt 34 onto the medium MD in the secondary transfer section 39, and fixed in the fixing device 60. By this process, it is possible to print an image on the medium MD, that is, to form an image.

For example, when the image forming device 1 successively transfers the silver toner image PS with the silver toner TS and the color toner images PL with the color toners TL to the intermediate transfer belt 34 at the image forming units 10, these images are transferred to the medium MD in the secondary transfer section 39. By this operation, the medium MD is brought into a state in which the color toner images PL and the silver toner image PS have been superimposed together and printed on its surface.

In the following description, the image formed by superimposing the silver toner image PS (i.e., the brilliant image) on the color toner images PL (i.e., the non-brilliant images) as above is referred to as a color metallic image (i.e., brilliant superimposition image PV). Further, in the following description, the process of forming and fixing (i.e., printing) the brilliant superimposition image PV on the medium MD is referred to also as a brilliant superimposition image print process.

In the image forming device 1, an adhesion amount of the toner T in the toner image transferred onto the medium MD can be increased by increasing the absolute value of the bias voltage applied to each component by the control by the control section 3, and the on-medium adhesion amount can be decreased by decreasing the absolute value of the bias voltage.

Next, the circuit configuration of the image forming device 1 will be described below. FIG. 3 is a functional block diagram showing the configuration of a control system of the image forming device 1. The control section 3 of the image forming device 1 is mainly formed of a print control section 80, to which a storage section 81, an interface section 82, a display control section 83, a process control section 84, a development voltage control section 85, a supply voltage control section 86, an exposure control section 87, a transfer voltage control section 88 and a motor control section 89 are connected.

The print control section 80 includes a CPU 91, a ROM (Read Only Memory) 92, a RAM (Random Access Memory) 93, and so forth, and executes various processes by making the CPU 91 execute various programs read out from the ROM 92, the storage section 81 or the like while using the RAM 93 as a work area.

The storage section 81 is a storage device including a nonvolatile storage medium such as an HDD (Hard Disk Drive) or an SSD (Solid State Drive), for example, and stores various programs and a variety of information. A normal color data conversion table 95, a brilliant color data conversion table 96 and a condition information table 97 are provided in the storage section 81.

The normal color data conversion table 95 stores information for forming parts expressed by the normal colors (e.g., black, cyan, magenta and yellow) as print patterns of the respective colors, included in print data acquired from the host device 100. The brilliant color data conversion table 96 stores information for forming a print pattern corresponding to parts to be expressed by the brilliant color (e.g., the silver color), included in the print data acquired from the host device 100.

The condition information table 97 stores a variety of information indicating various conditions of components in the image forming device 1, and the stored information is updated appropriately. The condition information table 97 stores, for example, a measured number of revolutions of the photosensitive drum 26 (FIG. 2) in the image forming unit 10 of each color. Further, the condition information table 97 stores, for example, the number of dots corresponding to the amount of use (amount of consumption) of the toner used for the printing after the last replacement of the toner container 12, counted in regard to the toner container 12 of each color. In the following description, the number of dots counted as above is referred to also as a dot count.

The interface section 82 is an interface for a wired LAN (Local Area Network) in conformity with a standard such as IEEE (Institute of Electrical and Electronics Engineers) 802.3u/ab/an/ae, a wireless LAN in conformity with a standard such as IEEE 802.11a/b/g/n/ac/ax, or the like, for example. The interface section 82 is capable of transmitting and receiving a variety of information to/from the host device 100, a predetermined server device (not shown), and so forth.

The display control section 83 forms display screen data, indicating a variety of display screens in which letters, figures, etc. are arranged appropriately, based on a command from the print control section 80 and makes the display section 4 display the display screen by sending out the display screen data to the display section 4.

The process control section 84 controls the voltage or the like of each component in the image forming unit 10 of each color based on a command from the print control section 80. The development voltage control section 85 controls development voltages applied to the development roller 24 and the development blade 25 (FIG. 2) based on a command from the print control section 80. The supply voltage control section 86 controls supply voltages applied to the first supply roller 22 and the second supply roller 23 (FIG. 2) based on a command from the print control section 80.

The exposure control section 87 controls the turning on or off of each light emitting element chip provided in the LED head 14 based on a command from the print control section 80. The transfer voltage control section 88 controls transfer voltages applied to the primary transfer roller 35, the secondary transfer roller 36 (FIG. 2), etc. based on a command from the print control section 80. The motor control section 89 controls the rotation of the photosensitive drum 26 (FIG. 2), the rollers, etc. based on a command from the print control section 80.

The host device 100 is an information processing device such as a personal computer, for example, and executes various application programs and the like for document preparation, spreadsheet, image editing, etc. based on operations by a user. Further, a printer driver for making the image forming device 1 print documents, images, etc. has previously been installed in the host device 100. When an application program receives the user's print command for printing document data, image data or the like, the host device 100 generates print data based on the document data, image data or the like by executing the printer driver and transmits the print data to the image forming device 1.

2. Toner

Next, the toners (referred to also as developing agents) stored in the toner containers 12 of the image forming units 10 (FIG. 2) will be described below. As the toners of black (K), cyan (C), magenta (M) and yellow (Y) as the normal colors, black, cyan, magenta and yellow toners commercially available for C941dn manufactured by Oki Electric Industry Co., Ltd. were respectively used.

As the toner of the special color(S) as the brilliant color (i.e., the brilliant toner), a toner of the silver color (silver) (hereinafter referred to also as the "silver toner") was manufactured and used as mentioned earlier. This silver toner was manufactured by a method described below.

When manufacturing the silver toner, in this embodiment, an aqueous medium in which an inorganic dispersant has been dispersed is produced first. Specifically, 600 [pts.wt.] of industrial trisodium phosphate dodecahydrate is mixed with 18, 400 [pts.wt.] of pure water and dissolved in the pure water at a solution temperature of 60 [° C.], and thereafter dilute nitric acid for pH (hydrogen ion exponent) adjustment is added, by which an aqueous solution is made. Into this aqueous solution, a calcium chloride aqueous solution obtained by dissolving 300 [pts.wt.] of industrial calcium chloride anhydride in 2,600 [pts.wt.] of pure water is poured, and the solution is stirred at high speed for 50 minutes by using a line mill (manufactured by Primix Corporation) at a revolution speed of 3566 [rpm] while maintaining the solution temperature at 60 [° C.]. By this process, an aqueous phase as an aqueous medium in which a suspension stabilizer (inorganic dispersant) has been dispersed is prepared.

Further, in this embodiment, a material-dispersed oily medium is produced. Specifically, a pigment dispersion solution is produced by mixing 470 [pts.wt.] of the brilliant pigment (volume median diameter: 5.4 [μm]) containing aluminum powder and 23 [pts.wt.] of a charge control agent (BONTRON E-84: manufactured by Orient Chemical Industries Co., Ltd.) with 7,000 [pts.wt.] of ethyl acetate as an organic solvent.

Incidentally, while the brilliant pigment with the volume mean particle diameter (referred to also as the volume median diameter) of 5.4 [μm] was used in this embodiment, the volume mean particle diameter of the brilliant pigment is not limited to this example. Specifically, the volume mean particle diameter of the brilliant pigment is preferably greater than or equal to 5 [μm] and less than or equal to 20 [μm], and is more preferably in a range of 5.3 [μm] to 5.7 [μm].

In the pigment dispersion solution, the brilliant pigment contains minute leaves (i.e., small pieces formed like flat plates, flattened objects or scales and each having a planar part) of aluminum (Al). In the following description, this brilliant pigment is referred to also as an aluminum pigment or a metallic pigment. Further, the volume mean particle diameter is referred to also as a volume particle diameter, the volume median diameter or a mean median diameter.

Thereafter, in this embodiment, while maintaining the solution temperature of the pigment dispersion solution at 60 [° C.], 175 [pts.wt.] of ester wax (WE-4: manufactured by NOF Corporation) and 1,670 [pts.wt.] of polyester resin are put into the pigment dispersion solution, and the solution is stirred until solid matter disappears. By this process, an oil phase as a pigment-dispersed oily medium is prepared.

Subsequently, in this embodiment, the oil phase is poured into the aqueous phase whose solution temperature has been lowered to 55 [° C.], and a suspension is formed by stirring the mixture of the oil phase and the aqueous phase for five minutes at a revolution speed of 1000 [rpm], by which particles are formed in the suspension. Subsequently, slurry containing the toner is formed by removing ethyl acetate from the suspension by distilling the suspension under reduced pressure. Further, pH is lowered to 1.6 or less by adding nitric acid to the slurry, the slurry is stirred, tricalcium phosphate as a suspension stabilizer is dissolved in the slurry, and the slurry is dehydrated, by which the toner is formed. Subsequently, a water rinse is carried out by redispersing the dehydrated toner in pure water and stirring the solution. Thereafter, in this embodiment, toner base particles are produced by executing a dehydration process, a drying process and a classification process.

In this embodiment, into the toner base particles produced as above, 1.5 [wt. %] of small silica (RY200: manufactured by Nippon Aerosil Co., Ltd.), 2.29 [wt. %] of colloidal silica (X24-9163A: manufactured by Shin-Etsu Chemical Co., Ltd.) and 0.37 [wt. %] of melamine particles (EPOSTAR S: manufactured by Nippon Shokubai Co., Ltd.) are mixed as an external additive process. As above, in this embodiment, the silver toner having the brilliance can be obtained.

Incidentally, even though the size of the small piece of aluminum as the brilliant pigment is specified to some extent by the value of the volume mean particle diameter as described earlier, the size is considered to take on a distribution centering at a certain range according to a Gaussian distribution or the like, for example.

Thus, similarly, the size of the silver toner manufactured by using the brilliant pigment is also considered to take on a distribution centering at a certain range. In this embodiment, the volume mean particle diameter (volume median diameter) of the produced silver toner was measured and the result of the measurement was 15.01 [μm]. Incidentally, the volume mean particle diameter of the silver toner is not limited to 15.01 [μm] but can also be in a range from 10 [μm] to 20 [μm], for example.

On the other hand, in the image forming device 1 (FIG. 1), in the image forming unit 10 for forming the silver toner image (i.e., the image forming unit 10S), the silver toner is supplied to the first supply roller 22 and the like while stirring the toner inside the toner container 12 (FIG. 2) storing the silver toner and inside the toner storage space 21, etc.

In this case, it has been found that silver toner particles in relatively small sizes among all the silver toner particles tend to be used (consumed) preferentially in the image forming unit 10. That is, in the image forming device 1, the size of the silver toner TS (particle) is relatively small just after replacement of the toner container 12 storing the silver toner TS, and the size of the silver toner TS (particle) increases as the silver toner TS is used (consumed).

It can be inferred that this is caused by the following reason. That is, the particle diameter of the silver toner TS takes on a particle diameter distribution centering at the value of the volume mean particle diameter as described earlier. Further, with the decrease in the particle diameter, the silver toner TS decreases in the content of the brilliant pigment having electrical conductivity and increases in the amount of electrification, and thus becomes more effective for the development. As a result, in the image forming unit 10, in an initial stage of the printing just after the replacement of the toner container 12, the silver toner TS at small particle diameters, with a low content of the brilliant pigment and low electrical conductivity, is preferentially used (consumed) in regard to the brilliant developing agent for the development.

Accordingly, in the image forming device 1, when an image using the silver toner is printed, the size of the silver toner included in the image varies depending on the amount of consumption of the silver toner since the time point of the replacement of the toner container 12 of the silver color, and thus there are cases where the impression given to the user viewing the image also varies.

Therefore, in this evaluation test, the image forming device 1 is configured so as to count the amount of consumption of the silver toner since the time point of the replacement of the toner container 12 of the silver color as a dot count d and switch a part of the process depending on the dot count d.

3. Evaluation of Brilliant Superimposition Image PV

Next, a description will be given of cases where an image in which color toner images PL with color toners TL of normal colors (here, magenta, yellow and cyan excluding black are considered) and a silver toner image PS with the silver toner TS of the brilliant color (namely, the silver color)

are superimposed together, namely, a brilliant superimposition image PV, is printed by the image forming device 1.

As described earlier, when a brilliant superimposition image PV (i.e., color metallic image) is printed on a medium MD, in each part of the brilliant superimposition image PV, there occurs the phenomenon in which the saturation of color decreases (i.e., the color gamut becomes narrower) in comparison with a color toner image PL with color toners TL only. This is caused by the fixation of the brilliant superimposition image PV in the state in which the superimposed silver toner TS is covering the surface of the color toners TL. Further, this phenomenon necessarily occurs any time when the silver toner TS is superimposed on a color toner image PL with a color toner TL of any color (magenta, yellow, cyan, black).

Therefore, in this embodiment, various evaluation tests were conducted in regard to the color gamut in the brilliant superimposition image PV. The evaluation tests will be described below.

3-1. Indices Used for Evaluation

In the evaluation tests, the adhesion amount of the toner (color toner TL or silver toner TS) to the medium MD per unit area is represented by image density [%]. This image density corresponds to the ratio of the area of the whole of a printable range that can be printed on by the image forming device 1 (e.g., a region corresponding to one medium MD) to the area of a printed part (a part where the image is formed) on the medium MD. When an image to make the area ratio 100% is printed similarly to the so-called full-page solid color printing, the image density is 100%. For example, when an image is printed on a region corresponding to 1% of the area of the printable range on the medium MD, the image density is 1%.

Further, when a relatively small unit region in a rectangular shape is set and a print pattern N indicating arrangement of pixels where the toner is made to execute the printing (hereinafter referred to as "print pixels") is prescribed, the image density represents the ratio of the number of dots of the print pixels to the total number of dots in the unit region. For example, when the unit region is in a rectangular shape with a longitudinal length of 8 dots and a transverse length of 8 dots and the total number of dots in the unit region is 64 dots, the image density is 50% if the number of dots of the print pixels in the unit region is 32 dots, and the image density is 25% if the number of dots of the print pixels in the unit region is 16 dots.

Incidentally, the image density representing the adhesion amount of the toner (color toner TL or silver toner TS) to the medium MD per unit area is referred to also as a print image density, a print duty or a printing ratio.

Further, in the evaluation tests, a luminous reflectance difference ΔY was measured as a measurement value indicating the tint of the silver color, namely, the level of gray color of the brilliant superimposition image PV on the paper sheet. For the measurement of the luminous reflectance difference ΔY, a spectrophotometric colorimeter CM-2600d (manufactured by Konica Minolta Japan, Inc.) was used.

The luminous reflectance difference ΔY is calculated by subtracting the luminous reflectance Y2 of the medium MD before the printing from the luminous reflectance Y1 on the image after the printing of the image on the medium MD. As conditions at the time of the measurement by use of the spectrophotometric colorimeter CM-2600d, colorimetric auxiliary illuminant C (6774 [K]) was used as the light source and SCE (Specular Component Excluded) was employed in regard to specular reflection light. At the time of the measurement of the luminous reflectance Y, OS coat paper W with no image printed thereon was used as an underlay for the medium MD.

Furthermore, in the evaluation tests, a spectrophotometric colorimeter X-Rite exact (manufactured by X-Rite Inc.) was used in the measurement of the density and the color gamut of cyan on the paper sheet. As conditions at the time of the measurement by use of the spectrophotometric colorimeter X-Rite eXact, a light source D50, an angle 2°, and ISO Status I as density status were employed.

The color gamut (L*, a*, b* and C*) was represented by using C* that means the saturation in the color space and C* was calculated according to the following expression (1) based on a* and b* that can be measured by using the spectrophotometric colorimeter (L*, a* and b* as the hues on the paper sheet surface in the printed state).

$$C* = (a*^2 + b*^2)^{\frac{1}{2}} \tag{1}$$

In the evaluation tests, when the image density was set at 100% in each of the normal colors (magenta, yellow and cyan), the C* values in the normal colors were 72, 93 and 60, respectively. It means that, in a color in a state in which the silver toner TS is superimposed on the color toner TL of the normal color (hereinafter referred to also as a "metallic color"), as the C* value in the metallic color becomes closer to the C* value in the normal color, the color gamut is wider.

Further, in the evaluation tests, a "C* retention rate" calculated by using the C* was employed as an index value. This "C* retention rate" is a value representing the ratio in percentage between the C* value after superimposing the silver toner image PS on the color toner image PL and the C* value before superimposing the silver toner image PS on the color toner image PL. Specifically, the "C* retention rate" is calculated by dividing the C* value in the brilliant superimposition image PV in which the silver toner image PS is superimposed on the color toner image PL by the C* value in the color toner image PL alone and multiplying the quotient by the numerical value 100.

Furthermore, in the evaluation tests, a flop index value (hereinafter represented as an "FI value") was used as an index value representing luster of the medium MD. For the measurement of this FI value, a goniophotometer (variable angle photometer) GC-5000L (manufactured by Nippon Denshoku Industries Co., Ltd.) was used.

The FI value is a value representing the magnitude of the brilliance by the greatness of a numerical value, and can be calculated by the following expression (2). In the expression (2), the intensity of reflected light received respectively in directions of 0°, 30° and −65° with respect to the direction orthogonal to the sheet (medium) when light is applied to the sheet (medium) from a 45° angle is represented respectively as reflected light intensity $L*_0$, $L*_{30}$ and $L*_{-65}$.

$$FI = 2.69 \times \frac{(L*_{30} - L*_{-65})^{1.11}}{(L*_0)^{0.86}} \tag{2}$$

In the evaluation tests, in regard to the FI value, a comparison was made between the value obtained from a variety of image printed on the medium MD and the feeling of luster obtained from the image by viewing the image, and it was found that sufficiently high metallic luster was felt successfully when the FI value was greater than or equal to 10.0.

3-2. Conditions in Conducting Evaluation Tests

Next, a description will be given of various conditions or the like when evaluation media MD are produced by use of the image forming device 1 in the evaluation tests. In the evaluation tests, C941dn (manufactured by Oki Electric Industry Co., Ltd.) was used as the image forming device 1, and OS coat paper W (manufactured by FUJIFILM Business Innovation Corp.) in A4 size was used as the medium MD.

Figures 4, 5:
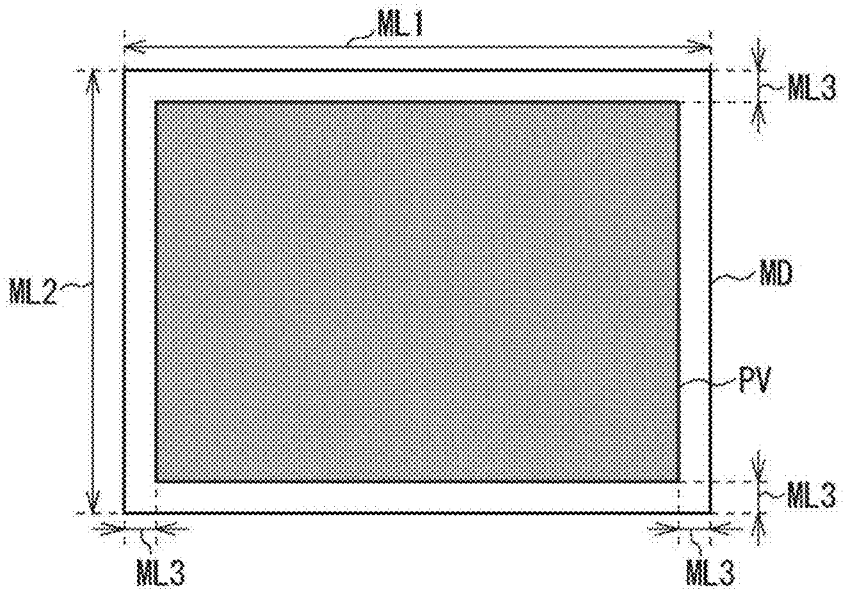
FIG. 4 is a schematic diagram showing an image formation range on a medium.
FIG. 5 is a diagram showing a measurement result and a calculation result in regard to a brilliant superimposition image of each color in tabular form.

FIG. 4 is a schematic diagram showing an image formation range on the medium MD. In the evaluation tests, print data representing a brilliant superimposition image PV in which the silver toner image PS is superimposed on a color toner image PL with the image density of 100% throughout the entire printable region on the medium MD in A4 size as shown in FIG. 4 was generated by the host device 100 (FIG. 3). Specifically, regarding the medium MD, the length ML1 of the long side is 297 [mm], the length ML2 of the short side is 210 [mm], and a margin length ML3 as the width of a margin part formed between each side and the brilliant superimposition image PV is 5 [mm].

In the evaluation tests, the resolution of the image printed by the image forming device 1 was 600 [dpi], and the length of one side of one dot (referred to also as a picture element or a pixel) was 0.042 [mm].

Further, in the evaluation tests, the various bias voltages (e.g., the development voltages) were previously adjusted in the image forming unit 10S (FIG. 1) of the brilliant color (silver color) in the image forming device 1 so that the luminous reflectance difference $\Delta Y$ takes on a value 33 when an image with the image density of 100% (i.e., solid image) is printed on the medium MD.

Furthermore, in the evaluation tests, the various bias voltages (e.g., the development voltages) were previously adjusted in the image forming unit 10M and the like (FIG. 1) of the normal colors (magenta and the like) in the image forming device 1 so that optical density O.D. takes on a value 1.4 when an image with the image density of 100% (i.e., solid image) is printed on the medium MD.

Moreover, in the evaluation tests, in the control section 3 (FIG. 3) of the image forming device 1, data conversion tables for converting the image density (i.e., area ratio of the image) were previously stored in the normal color data conversion table 95 and the brilliant color data conversion table 96 in the storage section 81.

Upon receiving the print data from the host device 100 (FIG. 3), the control section 3 of the image forming device 1 forms bitmap data for the printing based on the print data, generates separate bitmap data as data obtained by separating the bitmap data into the respective colors (silver color, cyan, etc.), and supplies the exposure control section 87 with exposure data generated through a predetermined conversion process or the like. In this case, the control section 3 refers to the brilliant color data conversion table 96, executes a print pattern conversion process of converting the separate bitmap data of the silver color into each print pattern N, and thereby reduces the image density to 50%, 25% or the like.

3-3. Determination of Image Density of Silver Toner

Next, a description will be given of the result of various measurements, evaluations, etc. by the evaluation tests. First, in the evaluation tests, multiple types of evaluation media were produced by configuring a plurality of brilliant superimposition images PV by combining multiple types of color toner images PL with multiple types of silver toner images PS and printing each of the brilliant superimposition images PV on a medium MD. Among the toner images, each color toner image PL was formed with cyan, magenta or yellow as a normal color and its image density was fixed at 100%. On the other hand, in the silver toner images PS, the image density was set at three types of densities: 100%, 50% and 25%.

Here, the values 100%, 50% and 25% of the image density are 1/1, ½ and ¼ in terms of fractions. Since dots constituting the image to be printed are arranged in a grid extending in the longitudinal direction and the transverse direction in the image forming device 1, when the print pattern N is formed with a relatively small number of dots, the image density can be realized with ease if the fraction is a relatively simple fraction. For such a reason, in the evaluation tests, the values 100%, 50% and 25% were employed as the image densities of the silver toner images PS.

In the evaluation tests, for each of the evaluation media produced as above, the FI value as the index representing the luster, C* as the index representing the saturation and the color gamut, and the "C* retention rate" representing the degree of retaining the saturation after the superimposition of the silver toner image were measured and calculated.

FIG. 5 is a diagram showing the measurement result (FI value, C*) and the calculation result "C* retention rate" [%] in regard to the brilliant superimposition image of each color in tabular form. The table TBL1 in FIG. 5 indicates results such as measurement values and calculated values obtained based on each evaluation medium while associating them with the color of the color toner image PL and the image density [%] of the silver toner image PS.

Figure 6:
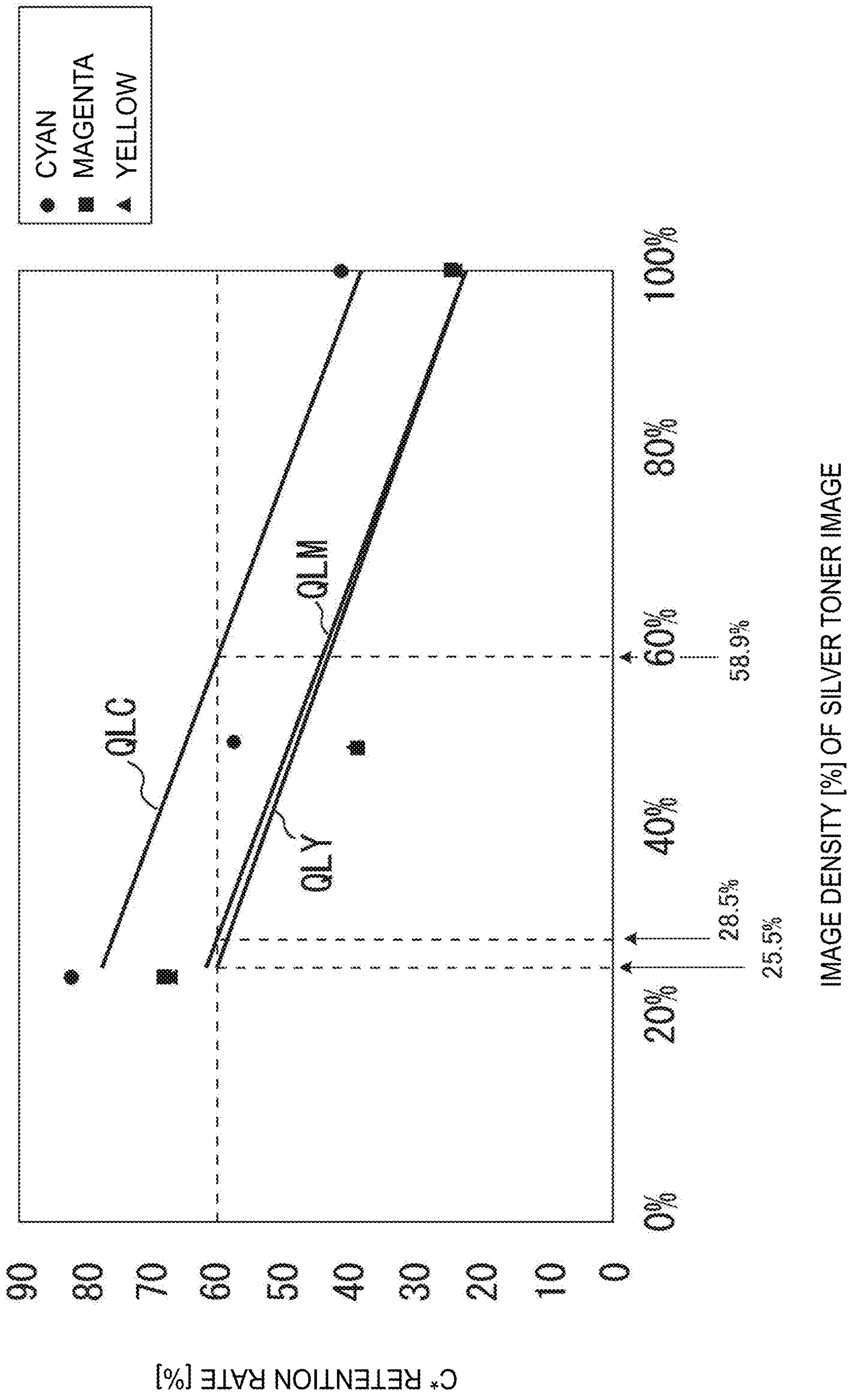
FIG. 6 is a graph showing a relationship between image density of a silver toner and a "C* retention rate" in the brilliant superimposition image of each color.

FIG. 6 is a graph showing a relationship between the image density [%] of the silver toner and the "C* retention rate" [%] in the brilliant superimposition image of each color. The values in the table TBL1 in FIG. 5 were plotted on a two-dimensional plane with coordinate axes respectively representing the image density of the silver toner image and the "C* retention rate", by which the graph shown in FIG. 6 was obtained. Further, linear approximation was made in a simple manner based on the plotting of each of cyan (black circular marks in FIG. 6), magenta (black quadrangular marks in FIG. 6) and yellow (black triangular marks in FIG. 6), by which characteristic curves QLC, QLM and QLY were obtained. Specifically, numerical expressions representing the characteristic curves QLC, QLM and QLY were obtained as the following expressions (3C), (3M) and (3Y) by using a variable x representing the image density of the silver toner image PS:

$$QLC=-51.714x+90.5 \tag{3C}$$

$$QLM=-56x+76 \tag{3M}$$

$$QLY=-52.857x+73.5. \tag{3Y}$$

In FIG. 6, when the "C* retention rate" is set at 60%, for example, from the viewpoint of maintaining the color tone of each color constant, the image densities of the silver toner images PS that should be respectively superimposed on the color toner images PL of cyan, magenta and yellow were obtained as 58.9%, 28.5% and 25.5%. These values are values relatively close to 50%, 25% and 25% respectively.

Next, in the table TBL1 in FIG. 5, a case where the image density of the silver toner image PS is gradually reduced from 100% in regard to cyan will be considered. In this case, the C* value in the part of the color toner image PL on which the silver toner image PS has been superimposed gradually increases and approaches "60" that is the C* value in the part of the color toner image PL of cyan single color on which the silver toner image PS has not been superimposed. On the other hand, the FI value of the part of the cyan color toner image PL on which the silver toner image PS has been superimposed gradually decreases and the metallic luster weakens. Therefore, in examples described later, the C* value and the FI value were made to take on well-balanced and relatively high values by setting the image density of the silver toner image PS to be superimposed on the part of the cyan color toner image PL at 50% (hereinafter represented as "cyan-silver 50%").

Next, consideration will be given to determining optimum image densities of silver toner images PS to be respectively superimposed on parts of the magenta and yellow color toner images PL when the setting "cyan-silver 50%" has been made. This is because a print result that the parts of the magenta and yellow color toner images PL have a color gamut and brilliance similar to those of cyan can be obtained if the color tone in the parts of the magenta and yellow color toner images PL can be adjusted to a color tone similar to that in the part of the cyan color toner image PL. That is, it can be expected to obtain a print result in which each color has similar color gamut and brilliance, in cases where the silver toner image is superimposed while using color toners of a plurality of colors in one image in order to coordinate the color tones of the color toner images PL of the plurality of colors.

In the evaluation tests, the FI value and the "C* retention rate" were mainly considered as indices for coordinating the color tones of the respective colors. As mentioned earlier, the "C* retention rate" is a value representing the ratio in percentage between the C* value retained in the color toner image PL after the silver toner image PS is superimposed thereon and the C* value of the color toner image PL before the silver toner image PS is superimposed thereon.

Incidentally, it is also possible to consider a method of comparing the C* values of respective colors as indices for coordinating the color tones of the respective colors. However, in this method, there can occur a problem in that the color tones of the respective colors as viewed look different from each other even if the respective colors are equal to each other in the C* value. It can be considered that this occurs because the C* value of the single color toner varies among the respective colors and magnitude of a color tone difference value (hereinafter represented as "ΔC*") between the single color toner and the silver toner also varies. For such reasons, in the evaluation tests, not the C* value itself but the "C* retention rate" is employed as an index.

Referring again to the table TBL1 in FIG. 5, even if the image density of the silver toner image PS is changed from 100% to 25%, the FI value of magenta remains approximately at a constant value (11.1 to 10.4) and is equivalent to the FI value (10.4) in the setting "cyan-silver 50%". Further, in the case where the image density of the silver toner image PS to be superimposed on magenta is set at 25%, the value (68%) of the "C* retention rate" is the closest to the value (58%) of the "C* retention rate" in the setting "cyan-silver 50%".

Next, based on the values in the table TBL1 in FIG. 5, consideration will be given to a range of the image density of the silver toner image PS in which the color tone of magenta can be coordinated with that of cyan. First, in regard to the setting "cyan-silver 50%" as the reference, ranges in which the FI value and the "C* retention rate" respectively vary depending on the dot count d after the time point of the replacement of the toner container 12 were determined, by which it was found that the FI value varies in a range from 10.3 to 11.3 and the "C* retention rate" varies in a range from 47% to 67%.

Subsequently, the FI value and the value of the "C* retention rate" in regard to magenta in the table TBL1 in FIG. 5 were considered.

FIGS. 7A and 7B are graphs showing a relationship among the image density [%] of the silver toner image, the FI value and the "C* retention rate" in regard to magenta. FIG. 7A shows an approximate curve ARF obtained by plotting the relationship between the image density [%] of the silver toner image PS and the FI value of magenta when the silver toner image PS at the image density [%] was superimposed on the color toner image of magenta and making approximation by use of a quadratic curve based on the plotting. In the approximate curve ARF, image density of the silver toner at which the FI value varies in the range from 10.3 to 11.3 (predetermined range of the FI value) similarly to the case of the setting "cyan-silver 50%" was obtained, and as a result, the range from 17% to 100% was found to be appropriate as a first image density as the image density [%] of the silver toner image PS.

FIG. 7B shows an approximate curve ARC according to a quadratic curve obtained by plotting the relationship between the image density [%] of the silver toner image PS on the color toner image of magenta and the "C* retention rate" [%] of magenta on a graph. In the approximate curve ARC, image density of the silver toner at which the "C* retention rate" varies in the range from 47% to 67% (predetermined range of the "C* retention rate") similarly to the case of the setting "cyan-silver 50%" was obtained, and as a result, the range from 23% to 44% was found.

That is, as the image density of the silver toner image PS at which the color tone of magenta can be coordinated with that of cyan, the range from 23% to 44% can be considered to be appropriate as a second image density as the image density [%] of the silver toner image PS. Therefore, in the evaluation tests, among values included in the range, 25% was employed as the image density of the silver toner image PS to be superimposed on magenta, as a value capable of forming the print pattern N with a relatively small number of dots. In the following description, setting the image density of the silver toner image PS to be superimposed on magenta at 25% is represented as "magenta-silver 25%".

On the other hand, focusing on yellow in the table TBL1 in FIG. 5, in any of the cases where the image density of the silver toner image PS was set at 100%, 50% and 25%, the FI value was below "10" and it was difficult to achieve the FI value (10.4) equivalent to the FI value in the case of the setting "cyan-silver 50%".

However, in the case where the image density of the silver toner image PS to be superimposed on the color toner image of yellow was set at 25% (hereinafter represented as "yellow-silver 25%"), the "C* retention rate" (67%) was equivalent to the "C* retention rate" (58%) in the case of the setting "cyan-silver 50%" even though the FI value (6.7) was below the FI value (10.4) in the case of the setting "cyan-silver 50%". Based on such relationships, in the evaluation tests, the image density of the silver toner image PS to be superimposed on yellow was set at 25% being equivalent to the image density of the silver toner image PS to be superimposed on magenta. In the following description, setting the image density of the silver toner image PS to be superimposed on yellow at 25% is represented as "yellow-silver 25%".

Here, consideration will be given to a relationship between the saturation of each color and the image density of the silver toner image PS to be superimposed. FIG. 8 is a diagram showing the C* value and various calculated values of each color in tabular form. The table TBL2 in FIG. 8 indicates the C* value (corresponding to the saturation) as a measurement value and calculated values regarding a toner image printed (i.e., fixed on the medium MD) at the image density of 100% in regard to each of cyan, magenta, yellow and the silver color. As shown in the table TBL2 in FIG. 8, the values of C* corresponding to the measured saturation were 60.0, 73.2, 93.6 and 1.9 in regard to the respective colors. That is, the saturation of cyan (60.0) took on a smaller value compared to those of magenta and yellow (73.2 and 93.6). In the evaluation tests, for convenience of description, the saturation of cyan is referred to also as "first saturation", and the saturation of magenta or yellow is referred to also as "second saturation".

Further, let a color tone difference ΔC* represent a difference value between the C* in each of the colors other than the silver color (i.e., the normal colors) and the C* of the silver color, the values of the color tone difference ΔC* respectively in cyan, magenta and yellow were 58.1, 71.3 and 91.7 as shown in the table TBL2 in FIG. 8.

Subsequently, ΔE as the color tone including lightness (L*) was calculated according to expression (4) shown below in regard to each of cyan, magenta, yellow and the silver color, and the ΔE took on values 81.3, 89.0, 128.9 and 73.4 in regard to the respective colors as shown in the table TBL2 in FIG. 8. Here, let a color tone difference ΔE* represent a difference value between ΔE in each of the colors other than the silver color (i.e., the normal colors) and ΔE of the silver color, the values of the color tone difference ΔE* respectively in cyan, magenta and yellow were 8.0, 15.6 and 55.5 as shown in the table TBL2 in FIG. 8.

$$\Delta E = \left(L*^2 + a*^2 + b*^2\right)^{\frac{1}{2}} \tag{4}$$

Based on the table TBL2 in FIG. 8, when a brilliant superimposition image PV is printed by superimposing a silver toner image PS on a color toner image PL of a normal color, the image density of the silver toner image PS can be determined in consideration of the image densities of the silver toner images PS to be respectively superimposed on cyan, magenta and yellow.

Specifically, if the color tone difference ΔC* is greater than or equal to 58.1 and less than 71.3 and the color tone difference ΔE* is greater than or equal to 8.0 and less than 15.6 in regard to a normal color, for example, the image density of the silver toner image PS to be superimposed can be set at 50% similarly to the case of cyan. Further, if the color tone difference ΔC* is greater than or equal to 71.3 and less than 91.7 and the color tone difference ΔE* is greater than or equal to 15.6 and less than 55.5 in regard to a normal color, for example, the image density of the silver toner image PS to be superimposed can be set at 25% similarly to the cases of magenta and yellow. In the following description, the image density (50%) of the silver toner image PS to be superimposed on cyan is referred to also as the "first image density", and the image density (25%) of the silver toner image PS to be superimposed on magenta or yellow is referred to also as the "second image density".

3-4. Print Pattern

Next, in the evaluation tests, multiple types of print patterns N including those for comparison were prepared in regard to brilliant superimposition images PV realizing "cyan-silver 50%", "magenta-silver 25%" and "yellow-silver 25%".

In the image forming device 1, each light emitting element chip of the LED head 14 (FIG. 2) is controlled to be on (lighting) or off (extinction) by the exposure control section 87 of the control section 3 (FIG. 3). Accordingly, the image forming device 1 executes the printing on parts where the respective light emitting element chips of the LED head 14 are set at on by making the toner develop the parts (i.e., by making the toner adhere to the parts) while not executing the printing on parts where the respective light emitting element chips are set at off by not making the toner develop the parts (i.e., by not making the toner adhere to the parts), by which an image based on the print pattern can be printed on the medium MD.

Each of FIGS. 9A to 9D includes a plan view and a side view schematically showing a print pattern N regarding cyan. Each of FIGS. 9A to 9D schematically shows a brilliant superimposition image PV on the medium MD. An upper part of each of FIGS. 9A to 9D is a plan view showing the state of the brilliant superimposition image PV on the medium MD as viewed from above, and a lower part of each of FIGS. 9A to 9D is a side view of the brilliant superimposition image PV on the medium MD. FIGS. 9A to 9D respectively show print patterns NC1, NC2, NC3 and NC4, each of which is in a square shape with each side 8 dots long, in which a layer on the lower side is the color toner image PL and a layer on the upper side is the silver toner image PS.

As shown in FIGS. 9A to 9D, in the print patterns NC1-NC4, the color toner image PL on the lower side uses the toner for all the dots and its image density is 100%. Incidentally, in all of the print patterns NC1-NC4, the color toner image PL is formed with the toner of cyan. In the following description, the print pattern N, as a pattern in which dots (pixels) using the toner are arranged, is referred to also as an arrangement pattern.

In the print pattern NC1 (FIG. 9A), the silver toner image PS on the upper side uses the toner for all the dots similarly to the color toner image PL on the lower side and its image density is 100%. That is, the print pattern NC1 represents an image (PV) configured by superimposing a silver solid image (PS) on a cyan solid image (PL).

In the print patterns NC2-NC4 (FIGS. 9B to 9D), in the silver toner image PS on the upper side, the silver toner is arranged at positions different from each other while setting the image density at 50%, by which different patterns are formed. That is, all of the print patterns NC2-NC4 are "cyan-silver 50%".

Specifically, in the print pattern NC2, the entire region in a square shape with the longitudinal length of 8 dots and the transverse length of 8 dots is divided into a plurality of small regions respectively in a rectangular shape with the longitudinal length of 4 dots and the transverse length of 1 dot and the silver toner is arranged in every other small region.

In the print pattern NC3, the entire region is divided into small regions respectively in a rectangular shape with the longitudinal length of 4 dots and the transverse length of 2 dots and the silver toner is arranged in every other small region.

In the print pattern NC4, the entire region is divided into small regions respectively in a square shape with the longitudinal length of 4 dots and the transverse length of 4 dots and the silver toner is arranged in every other small region.

For convenience of description, regarding the entire region and the small regions, the number of dots in the transverse direction as a main scanning direction is hereinafter referred to also as a "main scanning dot number", and the number of dots in the longitudinal direction as an auxiliary scanning direction is hereinafter referred to also as an "auxiliary scanning dot number".

FIGS. 10A to 10F are plan views schematically showing print patterns N regarding magenta and yellow. Each of FIGS. 10A to 10F is a schematic diagram of the medium MD on which a brilliant superimposition image PV has been printed, showing the state of the medium MD viewed from above. FIGS. 10A to 10F respectively show print patterns NM1, NM2, NM3, NM4, NM5 and NM6, and in each of the print patterns NM1-NM6, a layer on the lower side is the color toner image PL and a layer on the upper side is the silver toner image PS similarly to the print pattern NC1 (FIG. 9A) and the like.

Figure 10A:
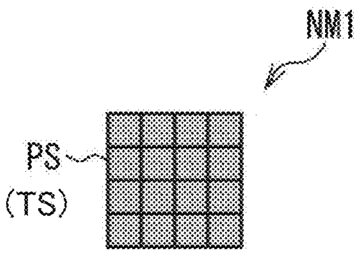
FIGS. 10A to 10F are plan views schematically showing print patterns regarding magenta and yellow.
Figure 10B:
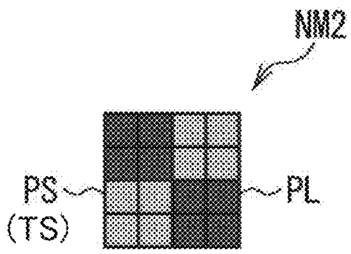
Figure 10C:
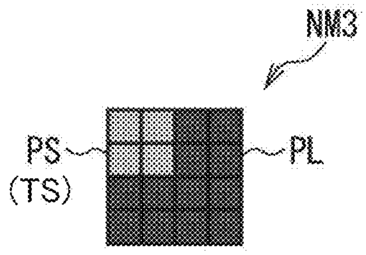
Figure 10D:
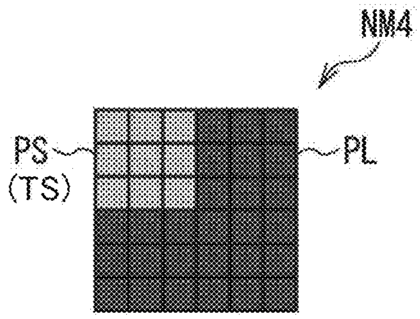
Figure 10E:
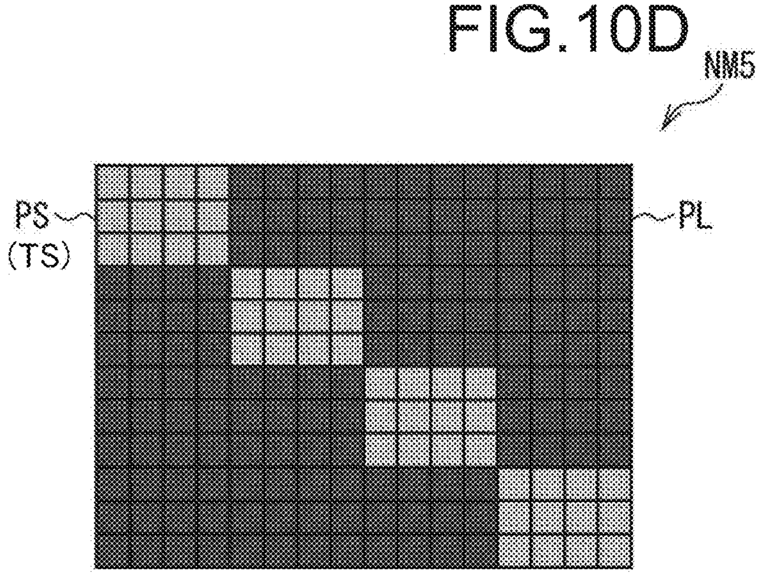
Figure 10F:
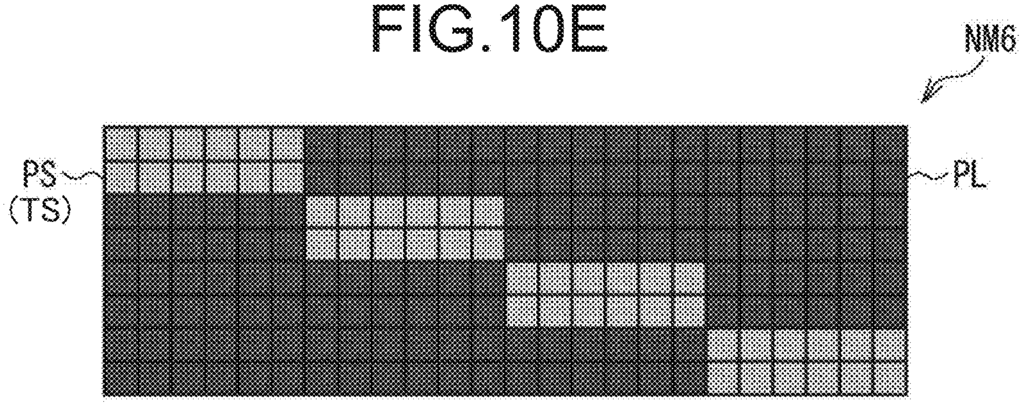

Each of the print patterns NM1, NM2 and NM3 shown in FIGS. 10A to 10C is formed in a square shape with each side 4 dots long. The print pattern NM4 shown in FIG. 10D is formed in a square shape with each side 6 dots long. The print pattern NM5 shown in FIG. 10E is formed in a rectangular shape with the longitudinal length of 12 dots and the transverse length of 16 dots. The print pattern NM6 shown in FIG. 10F is formed in a rectangular shape with the longitudinal length of 8 dots and the transverse length of 24 dots.

Further, each of the print patterns NM1-NM6 uses an image formed with the magenta toner alone (i.e., magenta solid image) or an image formed with the yellow toner alone (i.e., yellow solid image) as the color toner image PL.

The print pattern NM1 (FIG. 10A) is similar to the print pattern NC1 (FIG. 9A) in that in the silver toner image PS on the upper side, as in the color toner image PL on the lower side, the toner is used in all the dots and the image density is 100%. That is, the print pattern NM1 is configured by superimposing a silver solid image on a solid image of magenta or yellow.

In the print pattern NM2 (FIG. 10B), in the silver toner image PS on the upper side, the entire region in a square shape with the longitudinal length of 4 dots and the transverse length of 4 dots is divided into a plurality of small regions respectively in a square shape with the longitudinal length of 2 dots and the transverse length of 2 dots and the silver toner is arranged in every other small region. That is, in the print pattern NM2, the image density of the silver toner image PS is set at 50%.

In the print pattern NM3 (FIG. 10C), in the silver toner image PS on the upper side, the entire region in a square shape with the longitudinal length of 4 dots and the transverse length of 4 dots is divided into small regions respectively in a square shape with the longitudinal length of 2 dots and the transverse length of 2 dots and the silver toner is arranged in only one part out of the 4 parts in total. That is, in the print pattern NM3, the image density of the silver toner image PS is set at 25%, which corresponds to "magenta-silver 25%" or "yellow-silver 25%".

In the print pattern NM4 (FIG. 10D), in the silver toner image PS on the upper side, the entire region in a square shape with the longitudinal length of 6 dots and the transverse length of 6 dots is divided into a plurality of small regions respectively in a square shape with the longitudinal length of 3 dots and the transverse length of 3 dots and the silver toner is arranged in only one part out of the 4 parts in total. That is, in the print pattern NM4, in comparison with the print pattern NM3, each small region was expanded in the longitudinal direction and the transverse direction while similarly setting the image density of the silver toner image PS at 25% to correspond to "magenta-silver 25%" or "yellow-silver 25%".

In the print pattern NM5 (FIG. 10E), in the silver toner image PS on the upper side, the entire region in a rectangular shape with the longitudinal length of 12 dots and the transverse length of 16 dots is divided into a plurality of small regions respectively in a rectangular shape with the longitudinal length of 3 dots and the transverse length of 4 dots and the silver toner is arranged in 4 parts out of the 16 parts in total so as to draw a diagonal line (i.e., inclined line) connecting a top left part and a bottom right part of the entire region. That is, in the print pattern NM5, in comparison with the print pattern NM4, each small region was expanded in the transverse direction and the parts for arranging the silver toner were aligned linearly or stepwise in a diagonal direction (i.e., oblique direction) while similarly setting the image density of the silver toner image PS regarding the entire region at 25% to correspond to "magenta-silver 25%" or "yellow-silver 25%".

In the print pattern NM6 (FIG. 10F), in the silver toner image PS on the upper side, the entire region in a rectangular shape with the longitudinal length of 8 dots and the transverse length of 24 dots is divided into a plurality of small regions respectively in a rectangular shape with the longitudinal length of 2 dots and the transverse length of 6 dots and the silver toner is arranged in 4 parts out of the 16 parts in total so as to draw a diagonal line connecting the top left part and the bottom right part of the entire region. That is, in the print pattern NM6, compared to the print pattern NM5, the image density of the silver toner image PS regarding the entire region is similarly set at 25%, which corresponds to "magenta-silver 25%" or "yellow-silver 25%". Then, in the print pattern NM6, each small region is reduced in the longitudinal direction and expanded in the transverse direction and the parts for arranging the silver toner are similarly aligned linearly or stepwise in the diagonal direction.

3-5. Examples and Comparative Examples

Next, evaluation tests were conducted in regard to a plurality of examples X (i.e., X1C, X2M and X3Y) and a plurality of comparative examples Z (i.e., Z1C, Z2C, Z3M, Z4M, Z5Y and Z6Y) around "cyan-silver 50%", "magenta-silver 25%" and "yellow-silver 25%" by printing brilliant superimposition images PV in appropriately varied print patterns N (FIGS. 9A to 9D and FIGS. 10A to 10F) on the media MD.

Further, in the evaluation tests, the dot count d representing the amount of use (the amount of consumption) of the silver toner since the time point of the replacement of the toner container 12 (FIG. 2) was counted in the image forming unit 10S (FIG. 1) of the silver color and the print pattern N in the examples X and the comparative examples Z was appropriately switched depending on the dot count d of the silver toner (i.e., silver color dot count d). The reason for switching the print pattern N depending on the silver color dot count d will be described later. Further, the dot count d is hereinafter referred to also as a "post-replacement use amount".

FIGS. 11A and 11B are diagrams showing a correspondence relationship between the dot count d of the silver color and the print pattern N regarding each color. The evaluation tests were conducted in regard to the example X1C regarding cyan, the example X2M regarding magenta and the example X3Y regarding yellow. Specifically, in the evaluation tests, tables TBL3 and TBL4 shown in FIGS. 11A and 11B were previously stored in the brilliant color data conversion table 96 provided in the storage section 81 (FIG. 3) of the image forming device 1 so as to switch the print pattern N of each example depending on the dot count d.

The print pattern N used for the evaluation test of the example X1C (FIG. 11A) of cyan was set at the print pattern NC2 (FIG. 9B) when the dot count d was in a range greater than or equal to 0 and less than 1661 k, the print pattern NC3 (FIG. 9C) when the dot count d was in a range greater than or equal to 1661 k and less than 3344 k, and the print pattern NC4 (FIG. 9D) when the dot count d was in a range greater than or equal to 3344 k. The character "k" represents 103.

Figure 9A:
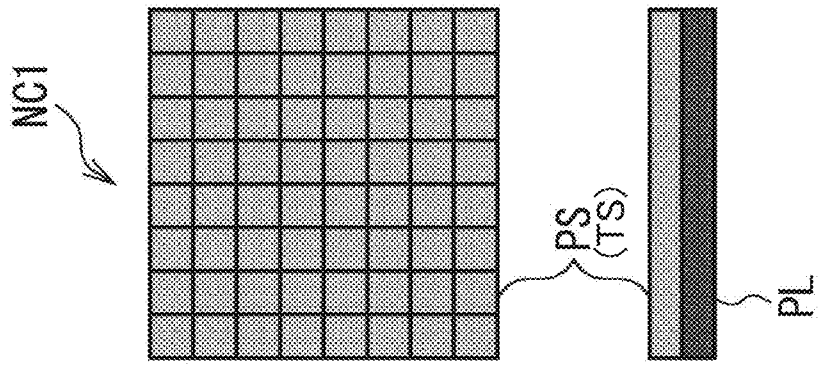
FIGS. 9A to 9D are a plan view and a side view schematically showing a print pattern regarding cyan respectively.
Figure 9B:
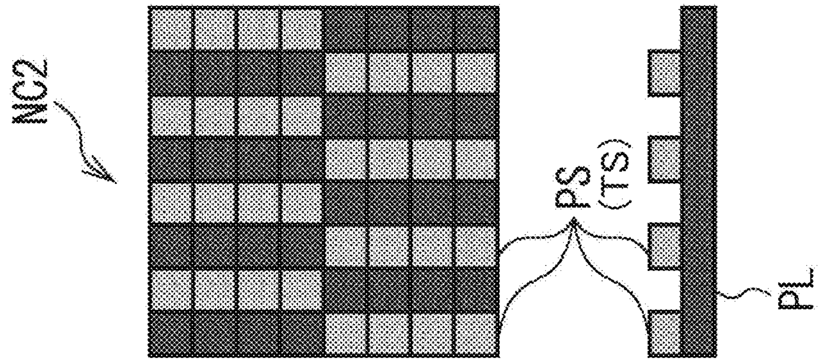
Figure 9C:
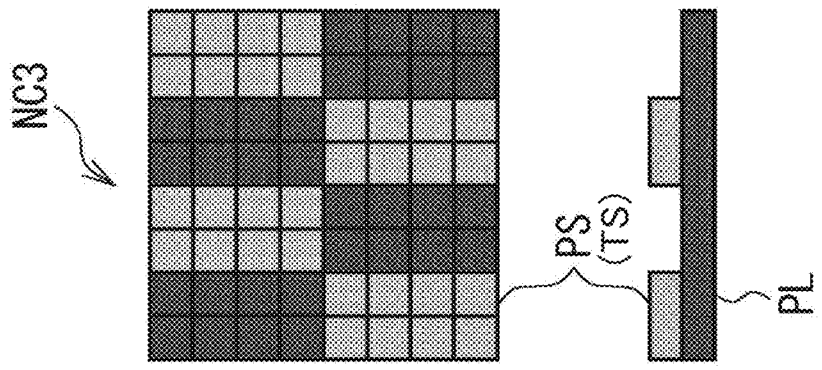
Figure 9D:
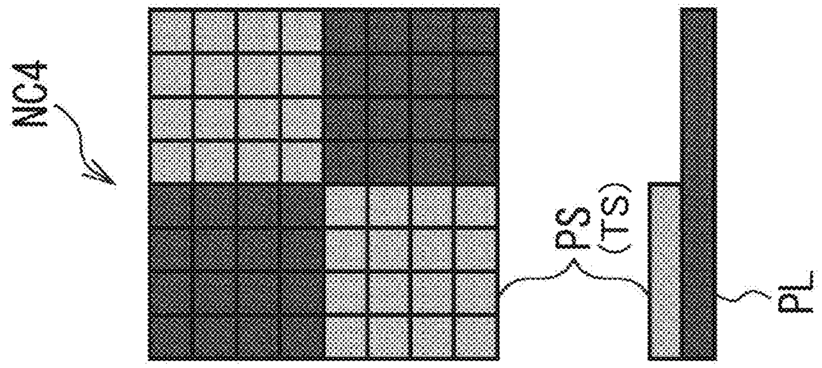

That is, in the example X1C, "cyan-silver 50%" was employed and with the increase in the dot count d, the transverse direction length of each small region (i.e., rectangle) forming the silver toner image PS was successively extended (1 in FIG. 9B, 2 in FIG. 9C, and 4 in FIG. 9D) while maintaining the longitudinal direction length of each small region and the area of each small region was gradually increased (1×4=4 in FIG. 9B, 2×4=8 in FIG. 9C, and 4×4=16 in FIG. 9D) as shown in FIGS. 9B to 9D.

The print pattern N used for the evaluation test of the example X2M (FIG. 11B) of magenta was set at the print pattern NM3 (FIG. 10C) when the dot count d was in a range greater than or equal to 0 and less than 1660 k and the print pattern NM4 (FIG. 10D) when the dot count d was in a range greater than or equal to 1660 k and less than 3232 k. Further, the print pattern N used for the evaluation test of the example X2M was set at the print pattern NM5 (FIG. 10E) when the dot count d was in a range greater than or equal to 3232 k and less than 8589 k and the print pattern NM6 (FIG. 10F) when the dot count d was in a range greater than or equal to 8589 k.

That is, in the example X2M, "magenta-silver 25%" was employed and with the increase in the dot count d, each small region (i.e., rectangle) forming the silver toner image PS was expanded in the longitudinal direction and the transverse direction (2 in the longitudinal direction and 2 in the transverse direction in FIG. 10C and 3 in the longitudinal direction and 3 in the transverse direction in FIG. 10D), then the arrangement was changed to the stepwise arrangement in the diagonal direction (3 in the longitudinal direction and 4 in the transverse direction in FIG. 10E), and thereafter each small region was contracted in the longitudinal direction and extended in the transverse direction (2 in the longitudinal direction and 6 in the transverse direction in FIG. 10F) as shown in FIGS. 10C to 10F.

The print pattern N used for the evaluation test of the example X3Y (FIG. 11B) of yellow was configured partially the same as the print pattern N used for the evaluation test of the example X2M of magenta. That is, in the example X3Y of yellow, the print pattern N was set at the print pattern NM3 (FIG. 10C) when the dot count d was in the range greater than or equal to 0 and less than 1660 k and the print pattern NM4 (FIG. 10D) when the dot count d was in the range greater than or equal to 1660 k and less than 3232 k. Further, the print pattern N used for the evaluation test of the example X3Y was set at the print pattern NM5 (FIG. 10E) when the dot count d was in a range greater than or equal to 3232 k and less than 6929 k and the print pattern NM6 (FIG. 10F) when the dot count d was in a range greater than or equal to 6929 k.

That is, in the example X3Y, "yellow-silver 25%" was employed and with the increase in the dot count d, each small region (i.e., rectangle) forming the silver toner image PS was expanded in the longitudinal direction and the transverse direction (2 in the longitudinal direction and 2 in the transverse direction in FIG. 10C and 3 in the longitudinal direction and 3 in the transverse direction in FIG. 10D), then the arrangement was changed to the stepwise arrangement in the diagonal direction (3 in the longitudinal direction and 4 in the transverse direction in FIG. 10E), and thereafter each small region was contracted in the longitudinal direction and extended in the transverse direction (2 in the longitudinal direction and 6 in the transverse direction in FIG. 10F) as shown in FIGS. 10C to 10F. In other words, while the example X3Y uses the same print pattern N as the example X2M in a dot count d range less than 6929 k and a dot count d range greater than or equal to 8564 k, the example X3Y differs from the example X2M only in a dot count d range greater than or equal to 6929 k and less than 8564 k and uses the print pattern NM6.

Further, for comparison with the examples X, the evaluation tests were conducted in regard to comparative examples Z1C and Z2C regarding cyan, comparative examples Z3M and Z4M regarding magenta and comparative examples Z5Y and Z6Y regarding yellow. Specifically, in the evaluation tests, information regarding the comparative examples Z was stored in the tables TBL3 and TBL4 (FIGS. 11A and 11B) stored in the brilliant color data conversion table 96 (FIG. 3) similarly to the information regarding the examples X.

The print pattern N used for the evaluation test of the comparative example Z1C (FIG. 11A) of cyan was set at the print pattern NC1 (FIG. 9A) irrespective of the dot count d. That is, in the comparative example Z1C, both of the color toner image PL of cyan and the silver toner image PS were formed as solid images. In other words, in the comparative example Z1C, the image is the same as the image obtained by generic color metallic printing of cyan.

The print pattern N used for the evaluation test of the comparative example Z2C (FIG. 11A) of cyan was fixed at the print pattern NC2 (FIG. 9B) irrespective of the dot count d. That is, in the comparative example Z2C, while employing "cyan-silver 50%", the size and arrangement of each small region (i.e., rectangle) forming the silver toner image PS were set constant irrespective of the dot count d.

The print pattern N used for the evaluation test of the comparative example Z3M (FIG. 11B) of magenta was set at the print pattern NM1 (FIG. 10A) irrespective of the dot count d. That is, in the comparative example Z3M, both of the color toner image PL of magenta and the silver toner image PS were formed as solid images similarly to the comparative example Z1C of cyan. In other words, in the comparative example Z3M, the image is the same as the image obtained by generic color metallic printing of magenta. In the comparative example Z4M (FIG. 11B) of magenta, the print pattern N was fixed at the print pattern NM3 (FIG. 10C) irrespective of the dot count d. That is, in the comparative example Z4M, while employing "magenta-silver 25%", the size and arrangement of each small region (i.e., rectangle) forming the silver toner image PS were set constant irrespective of the dot count d.

The print pattern N used for the evaluation test of the comparative example Z5Y (FIG. 11B) of yellow was set at the print pattern NM1 (FIG. 10A) irrespective of the dot count d. That is, in the comparative example Z5Y, both of the color toner image PL of yellow and the silver toner image PS were formed as solid images similarly to the comparative example Z3M of magenta. In other words, in the comparative example Z5Y, the image is the same as the image obtained by generic color metallic printing of yellow.

In the comparative example Z6Y (FIG. 11B) of yellow, the print pattern N was fixed at the print pattern NM3 (FIG. 10C) irrespective of the dot count d. That is, in the comparative example Z6Y, while employing "yellow-silver 25%", the size and arrangement of each small region (i.e., rectangle) forming the silver toner image PS were set constant irrespective of the dot count d similarly to the comparative example Z4M of magenta.

Further, evaluation tests were conducted in regard to each of the examples X and the comparative examples Z according to the following steps:

<Step 1> In the state in which the toner container 12 in the image forming unit 10S of the silver color has been replaced and the dot count d is at the value "0" in the image forming device 1, a brilliant superimposition image PV in the print pattern N corresponding to the dot count d is printed on a medium MD.

<Step 2> The FI value and the C* value of the medium MD (i.e., the evaluation medium) printed with the brilliant superimposition image PV are measured.

<Step 3> The value of the dot count d is increased until the value reaches the next boundary value (e.g., 1661 k, 1660 k or the like) of the dot count d in the table TBL3 in FIG. 11A or the table TBL4 in FIG. 11B by repeating a process of printing an image with the image density 100% of the silver toner image PS on a medium MD in the image forming device 1.

<Step 4> A brilliant superimposition image PV in the print pattern N corresponding to the dot count d at the boundary value is printed on a medium MD.

<Step 5> The processing from <Step 2> to <Step 4> is repeated, the toner stored in the toner container 12 is totally consumed, and the process is ended when the toner stored in the toner storage space 21 (FIG. 2) of the image forming unit 10 is also totally consumed.

In the evaluation tests, the toner was totally consumed in regard to cyan when the dot count d reached 9863 k, and in regard to magenta and yellow when the dot count d reached 11771 k.

3-6. Result of Evaluation Tests

Next, measurement results of the luster (specifically, the FI value) and the color gamut (specifically, the C* value) in regard to the examples and the comparative examples by the evaluation tests will be described below.

FIGS. 12A to 12D are diagrams showing the FI value and the C* value of each color corresponding to the dot count d of the silver color in the evaluation tests in tabular form.

First, the table TBL5 in FIG. 12A is a table associating each of the measurement results of the FI value in the example X1C of cyan and the comparative examples Z1C and Z2C of cyan with a value of the dot count d. The table TBL6 in FIG. 12B is a table associating each of the measurement results of the C* value in the example X1C and the comparative examples Z1C and Z2C with a value of the dot count d. Further, in the table TBL5 in FIG. 12A and the table TBL6 in FIG. 12B, the standard deviation of the FI value and the standard deviation of the C* value in each example X and each comparative example Z were respectively calculated and described.

Comparing the example X1C with the comparative example Z1C in the table TBL5 in FIG. 12A, the example X1C is smaller in the standard deviation of the FI value. As mentioned earlier, in the example X1C, the image density of the silver toner image PS was set at 50%. On the other hand, in the comparative example Z1C, the image density of the silver toner image PS was set at 100%. Thus, it can be seen that the setting of the image density of the silver toner image PS at 50% in the example X1C led to a small and stable range of variation of the FI value, namely, approximately constant degree of the luster, irrespective of the increase in the dot count d.

Comparing the example X1C with the comparative example Z2C in the table TBL6 in FIG. 12B, the example X1C is smaller in the standard deviation of the C* value. As mentioned earlier, in the example X1C, the print pattern N is switched depending on the dot count d. On the other hand, in the comparative example Z2C, the print pattern N is set constant irrespective of the dot count d. Thus, it can be seen that the switching of the print pattern N depending on the dot count d in the example X1C led to a small range of variation of the C* value irrespective of the increase in the dot count d and is capable of inhibiting a great change in the saturation.

Next, the table TBL7 shown in FIG. 12C is a table associating each of the measurement results of the FI value in the examples X2M and X3Y and the comparative examples Z3M, Z4M, Z5Y and Z6Y of magenta and yellow with a value of the dot count d. The table TBL8 shown in FIG. 12D is a table associating each of the measurement results of the C* value in the examples X2M and X3Y and the comparative examples Z3M, Z4M, Z5Y and Z6Y with a value of the dot count d. Further, in the table TBL7 in FIG. 12C and the table TBL8 in FIG. 12D, the standard deviation of the FI value and the standard deviation of the C* value in each example X and each comparative example Z were respectively calculated and described.

Comparing the example X2M of magenta with the comparative example Z3M in the table TBL7 in FIG. 12C, the example X2M is smaller in the standard deviation of the FI value. As mentioned earlier, in the example X2M, the image density of the silver toner image PS was set at 25%. On the other hand, in the comparative example Z3M, the image density of the silver toner image PS was set at 100%. Thus, it can be seen that the setting of the image density of the silver toner image PS at 25% in the example X2M led to a small and stable range of variation of the FI value, namely, approximately constant degree of the luster, irrespective of the increase in the dot count d.

Comparing the example X2M of magenta with the comparative example Z4M in the table TBL8 in FIG. 12D, the example X2M is smaller in the standard deviation of the C* value. As mentioned earlier, in the example X2M, the print pattern N is switched depending on the dot count d. On the other hand, in the comparative example Z4M, the print pattern N is set constant irrespective of the dot count d. Thus, it can be seen that the switching of the print pattern N depending on the dot count d in the example X2M led to a small range of variation of the C* value irrespective of the increase in the dot count d and is capable of inhibiting a great change in the saturation.

Comparing the example X3Y of yellow with the comparative example Z5Y in the table TBL7 in FIG. 12C, the example X3Y is smaller in the standard deviation of the FI value. As mentioned earlier, in the example X3Y, the image density of the silver toner image PS was set at 25%. On the other hand, in the comparative example Z5Y, the image density of the silver toner image PS was set at 100%. Thus, it can be seen that the setting of the image density of the silver toner image PS at 25% in the example X3Y led to a small and stable range of variation of the FI value, namely, approximately constant degree of the luster, irrespective of the increase in the dot count d.

Comparing the example X3Y of yellow with the comparative example Z6Y in the table TBL8 in FIG. 12D, the example X3Y is smaller in the standard deviation of the C* value. As mentioned earlier, in the example X3Y, the print pattern N is switched depending on the dot count d. On the other hand, in the comparative example Z6Y, the print pattern N is set constant irrespective of the dot count d. Thus, it can be seen that the switching of the print pattern N depending on the dot count d in the example X3Y led to a small range of variation of the C* value irrespective of the increase in the dot count d and is capable of inhibiting a great change in the saturation.

FIG. 13 is diagram showing the average value of the "C* retention rate" [%] depending on the dot count d of the silver color in each example in tabular form. The table TBL9 in FIG. 13 shows a relationship between the dot count d and the average value of the "C* retention rate" [%] in the examples X1C, X2M and X3Y. It can be seen in the table TBL9 in FIG. 13 that the "C* retention rate" has a relatively small range of variation and remains approximately at a constant value irrespective of the dot count d in every one of the examples X1C, X2M and X3Y. That is, in the examples X1C, X2M and X3Y, constant saturation can be maintained excellently even in the process in which the dot count d increases.

Based on the above-described results of the evaluation tests, in the image forming device 1 according to the embodiment, information corresponding to the example X1C of cyan, the example X2M of magenta and the example X3Y of yellow (hereinafter referred to as "brilliant superimposition information") is previously stored in the brilliant color data conversion table 96 (FIG. 3) in the storage section 81 and the print patterns N are previously stored in the storage section 81.

4. Brilliant Superimposition Image PV Print Process

4-1. Procedure of Print Process

Figure 14:
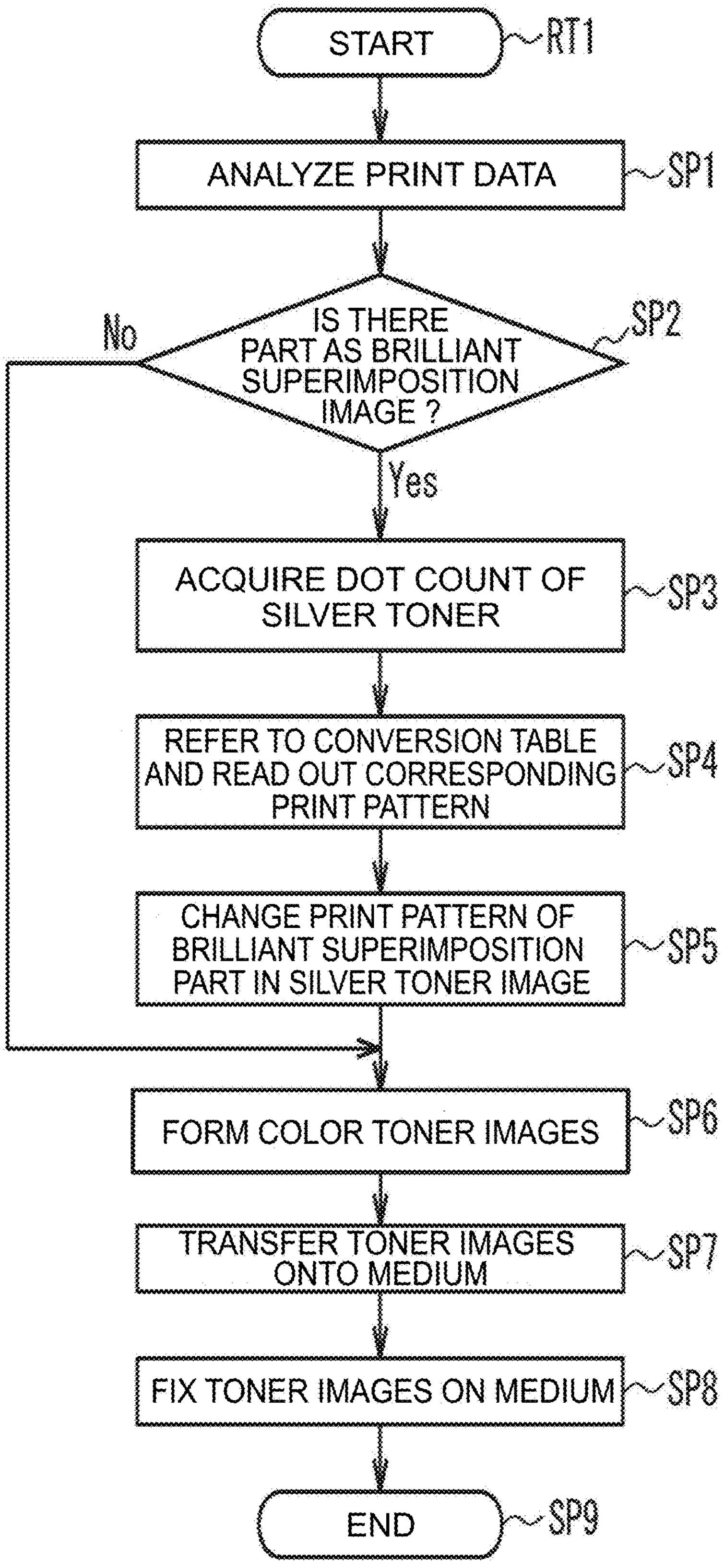
FIG. 14 is a flowchart showing a brilliant superimposition image print process.

A brilliant superimposition image print process executed when the brilliant superimposition image PV is printed on the medium MD by the image forming device 1 will be described below. FIG. 14 is a flowchart showing the brilliant superimposition image print process. Upon receiving the print data from the host device 100 via the interface section 82, the control section 3 (FIG. 3) of the image forming device 1 makes the print control section 80 read out a brilliant superimposition image print processing program from the storage section 81 and execute the program, starts a procedure RT1 of the brilliant superimposition image print process shown in FIG. 14, and advances to the first step SP1.

In the step SP1, the control section 3 analyzes the received print data and the process by the control section 3 advances to the next step SP2.

In the step SP2, the control section 3 judges whether or not the toner image that should be generated based on the print data includes a part where the silver toner with the image density of 100% should be superimposed on the color toner, namely, a part that should be formed as a brilliant superimposition image PV (hereinafter referred to as a "brilliant superimposition part"). If a positive result is obtained here (when YES in the step SP2), it means that the print pattern N should be changed in the brilliant superimposition part depending on the color of the color toner image. In this case, the process by the control section 3 advances to the next step SP3.

In the step SP3, the control section 3 acquires the dot count d of the silver toner from the condition information table 97 (FIG. 3) in the storage section 81 and the process by the control section 3 advances to the next step SP4.

In the step SP4, the control section 3 refers to the brilliant color data conversion table 96 (FIG. 3) in the storage section 81 and reads out the print pattern N corresponding to the color of the brilliant superimposition part and the dot count d and the process by the control section 3 advances to the next step SP5.

In the step SP5, the control section 3 changes the silver toner image PS in the brilliant superimposition part from the solid image with the image density of 100% to an image in the print pattern N and the process by the control section 3 advances to the next step SP6.

In contrast, if a negative result is obtained in the step SP2 (when NO in the step SP2), it means that it is unnecessary to change the print pattern since the toner image that should be generated based on the print data includes no brilliant superimposition part. In this case, the process by the control section 3 advances to the next step SP6.

In the step SP6, the control section 3 makes the image forming units 10 of the respective colors form the toner images of the respective colors, namely, the silver toner image PS and the color toner images PL, so as to be successively overlaid on the intermediate transfer belt 34 (FIG. 1 and FIG. 2) and the process by the control section 3 advances to the next step SP7. In the case where the toner image includes the brilliant superimposition part, the toner image formed in this case is an image in which the brilliant superimposition part has been changed to the print pattern N corresponding to the color of the color toner image PL and the dot count d.

In the step SP7, the control section 3 makes the secondary transfer section 39 transfer the toner images from the intermediate transfer belt 34 onto the surface of the medium MD conveyed thereto along the conveyance path W and the process by the control section 3 advances to the next step SP8.

In the step SP8, the control section 3 makes the fixing device 60 fix the toner images on the surface of the medium MD and makes the sheet ejection section 70 convey and eject the medium MD onto the sheet ejection tray 2T, and the process by the control section 3 advances to the next step SP9, in which the procedure RT1 of the brilliant superimposition image print process is ended.

4-2. Example 1 of Print Process

When the image is formed on the medium MD by superimposing the brilliant image (silver toner image PS) with the image density of 100% on the non-brilliant image (color toner image PL) (steps SP4 to SP8), if the saturation of the non-brilliant image (color toner image PL) is the first saturation (e.g., the C* value as the saturation of cyan shown in the table TBL2 in FIG. 8), the control section 3 controls the brilliant image forming section (the image forming unit 10S) and the non-brilliant image forming sections (the image forming units 10K, 10C, 10M and 10Y) as described below. Specifically, the control section 3 controls the image forming units 10S, 10K, 10C, 10M and 10Y so as to make them form a brilliant image (silver toner image PS) whose image density is the first image density (e.g., the image density 50% of the silver toner image PS superimposed on cyan shown in FIGS. 9B to 9D).

If the saturation of the non-brilliant image (color toner image PL) is the second saturation (e.g., the C* value as the saturation of magenta or yellow shown in the table TBL2 in FIG. 8) higher than the first saturation, the control section 3 controls the image forming units 10S, 10K, 10C, 10M and 10Y so as to make them form a brilliant image (silver toner image PS) whose image density is the second image density (e.g., the image density 25% of the silver toner image PS superimposed on magenta or yellow shown in FIGS. 10C to 10F) lower than the first image density.

4-3. Example 2 of Print Process

In the above-described example 1, it is also possible for the control section 3 to control the image forming units 10S, 10K, 10C, 10M and 10Y so as to change the arrangement pattern N of the dots where the brilliant developing agent (silver toner TS) is arranged in the brilliant image (silver toner image PS) (e.g., FIGS. 9B to 9D and FIGS. 10C to 10F) depending on the post-replacement use amount (dot count d) as the amount of use of the brilliant developing agent (silver toner TS) after the time point of the replacement of the brilliant developing agent container (the toner container 12 of the silver toner) in the brilliant image forming section (image forming unit 10S).

4-4. Example 3 of Print Process

In the above-described example 2, it is also possible for the control section 3 to control the image forming units 10S, 10K, 10C, 10M and 10Y so as to enlarge the range of each region where the brilliant developing agent (silver toner TS) is arranged in the part with the first image density (e.g., the image density 50% of the silver toner image PS superimposed on cyan shown in FIGS. 9B to 9D) in the brilliant image (silver toner image PS) with the increase in the post-replacement use amount (dot count d), in regard to at least one of the main scanning direction (e.g., the transverse direction in FIGS. 9B to 9D and the transverse direction in FIGS. 10C to 10F) in the brilliant image forming section (image forming unit 10S) and the auxiliary scanning direction (e.g., the longitudinal direction in the plan views in the upper parts of FIGS. 9B to 9D and the longitudinal direction in FIGS. 10C to 10F) orthogonal to the main scanning direction.

4-5. Example 4 of Print Process

In the above-described example 2, it is also possible for the control section 3 to control the image forming units 10S, 10K, 10C, 10M and 10Y so as to repeatedly arrange the small regions, whose numbers of dots in the main scanning direction and the auxiliary scanning direction are respectively the main scanning dot number and the auxiliary scanning dot number, like a grid and to increase at least one of the main scanning dot number and the auxiliary scanning dot number (e.g., the number of dots in the transverse direction in FIGS. 9B to 9D) with the increase in the post-replacement use amount (dot count d) in the part with the first image density (e.g., the image density 50% of the silver toner image PS superimposed on cyan shown in FIGS. 9B to 9D) in the brilliant image (silver toner image PS).

4-6. Example 5 of Print Process

In the above-described example 4, it is also possible for the control section 3 to control the image forming units 10S, 10K, 10C, 10M and 10Y so as to change the ratio between the main scanning dot number and the auxiliary scanning dot number (e.g., "1:4" in FIG. 9B, "2:4" in FIG. 9C, or "4:4" in FIG. 9D) with the change in the post-replacement use amount (dot count d) in the part with the first image density in the brilliant image (silver toner image PS).

4-7. Example 6 of Print Process

In the above-described example 5, it is also possible for the control section 3 to control the image forming units 10S, 10K, 10C, 10M and 10Y so as to arrange pixels to use the brilliant developing agent (silver toner TS) in a diagonal direction (e.g., FIG. 9D) different from either of the main scanning direction and the auxiliary scanning direction in the small region.

4-8. Example 7 of Print Process

In the above-described example 1, it is also possible for the control section 3 to control the image forming units 10S, 10K, 10C, 10M and 10Y so as to arrange dots to use the brilliant developing agent (silver toner TS) in a diagonal direction (e.g., FIGS. 10E and 10F) different from either of the main scanning direction and the auxiliary scanning direction in the brilliant image forming section (image forming unit 10S) in the part where the non-brilliant image (color toner image PL) to be superimposed thereon has the second saturation (e.g., the C* value as the saturation of magenta or yellow shown in the table TBL2 in FIG. 8) in the brilliant image (silver toner image PS).

4-9. Example 8 of Print Process

In the above-described example 1, it is also possible for the control section 3 to control the image forming units 10S, 10K, 10C, 10M and 10Y so as to arrange dots to use the brilliant developing agent (silver toner TS) in the main scanning direction or the auxiliary scanning direction in the brilliant image forming section (image forming unit 10S) in the part where the non-brilliant image (color toner image PL) to be superimposed thereon has the first saturation (e.g., the C* value as the saturation of cyan shown in the table TBL2 in FIG. 8) in the brilliant image (silver toner image PS).

4-10. Example 9 of Print Process

In the above-described example 1, it is also possible for the control section 3 to set the second image density so that the difference in the index value representing the degree of the brilliance (the FI value) between the non-brilliant image (e.g., the color toner image PL of cyan) with the first saturation (e.g., the C* value as the saturation of cyan shown in the table TBL2 in FIG. 8) on which the brilliant image (silver toner image PS) with the first image density has been superimposed and the non-brilliant image (the color toner image PL of magenta or yellow) with the second saturation on which the brilliant image (silver toner image PS) with the second image density (e.g., the image density 25% of the silver toner image PS superimposed on magenta or yellow shown in FIGS. 10C to 10F) has been superimposed is in a predetermined range (e.g., the predetermined range of the FI value in FIG. 7A) and the ratio of the change in the saturation (C*) ("C* retention rate") when the post-replacement use amount (dot count d) as the amount of use of the brilliant developing agent (silver toner TS) after the time point of the replacement of the brilliant developing agent container (the toner container 12 of the silver toner) in the brilliant image forming section (image forming unit 10S) has changed is in a predetermined range (e.g., the predetermined range of the "C* retention rate" in FIG. 7B). Further, the second image density is higher than or equal to 23% and lower than or equal to 44%, for example, as shown in FIG. 7B.

Further, when the image is formed on the medium MD by superimposing the brilliant image (silver toner image PS) with the image density of 100% on the non-brilliant image (color toner image PL) (steps SP4 to SP8), it is also possible for the control section 3 to control the image forming units 10S, 10K, 10C, 10M and 10Y so as to make them form a brilliant image (silver toner image PS) whose image density is the first image density (e.g., the image density 50% of the silver toner image PS superimposed on cyan shown in FIGS. 9B to 9D) if the saturation of the non-brilliant developing agent (color toner TL) is the first saturation (e.g., the C* value as the saturation of cyan shown in the table TBL2 in FIG. 8) and form a brilliant image (silver toner image PS) whose image density is the second image density lower than the first image density if the saturation of the non-brilliant developing agent (color toner TL) is the second saturation (e.g., the C* value as the saturation of magenta or yellow shown in the table TBL2 in FIG. 8) higher than the first saturation.

5. Effect and Other Features

In the above-described configuration, the image forming device 1 according to this embodiment previously stores the print patterns N (e.g., FIGS. 9A to 9D and FIGS. 10A to 10F) in the storage section 81 (FIG. 3) and previously stores the brilliant superimposition information corresponding to the examples X1C, X2M and X3Y (FIGS. 11A and 11B) in the brilliant color data conversion table 96. Then, when the brilliant superimposition part is included in the print data received from the host device 100, the image forming device 1 refers to the brilliant superimposition information and executes the printing on the medium MD by changing the silver toner image PS in the brilliant superimposition part to the print pattern N corresponding to the dot count d of the silver color and the color of the color toner image PL to be superimposed thereon.

In this case, the image forming device 1 sets the image density of the superimposed brilliant image (i.e., the silver toner image PS) at a relatively great value (first image density) if the color is a color with relatively low saturation (first saturation) in the single color and sets the image density of the superimposed brilliant image (i.e., the silver toner image PS) at a relatively small value (second image density) if the color is a color with relatively high saturation (second saturation) in the single color. Specifically, the image forming device 1 sets the image density of the superimposed silver toner image PS at 50% (first image density) if the color is cyan with relatively low saturation (first saturation) in the single color and sets the image density of the superimposed silver toner image PS at 25% (second image density) if the color is magenta or yellow with relatively high saturation (second saturation) in the single color.

Therefore, the image forming device 1 is capable of substantially equalizing the degree of the luster in the brilliant superimposition part in the image printed on the medium MD by setting the FI value at values relatively close to each other in parts where the color of the color toner image PL differ from each other, and is capable of substantially equalizing the saturation in the brilliant superimposition part in the image printed on the medium MD by also setting the "C* retention rate" at values relatively close to each other. That is, with the image forming device 1, when a brilliant superimposition image PV is printed based on a color toner image PL in which various colors are respectively used for a plurality of parts, for example, it is possible to obtain an excellent image in which the degree of the luster and the saturation are equalized among the parts of various colors and uniform luster is exhibited while retaining the tint of the original image as a whole.

Incidentally, when silver toner images PS at the same image density are respectively superimposed on color toners of a plurality of colors having C* values close to each other, there are cases where the degree of the change in the color tone varies from color to color. It can be inferred that this is caused by variation in the magnitude of the difference value of C* (i.e., color tone difference) between the original color and the color after the superimposition of the silver toner image PS.

Therefore, in the image forming device 1 according to this embodiment, the image density of the silver toner image PS to be superimposed on each color was set by focusing on the "C* retention rate" instead of the C* value of each color. This "C* retention rate" represents the degree of smallness of the change in the C* value from the C* value of the single color when the silver toner image PS is superimposed on the color toner image PL of each color. Accordingly, with the image forming device 1, the degree of the change in the color tone due to the superimposition of the silver toner image PS can be equalized among different colors and a great change in the impression of the image due to the superimposition of the silver toner image PS can be prevented.

Further, as for the silver toner TS, the particle diameter of the silver toner TS takes on a particle diameter distribution centering at the value of the volume mean particle diameter and the amount of electrification varies depending on the particle diameter as described earlier. Thus, in regard to the brilliant developing agent for the development in the image forming unit 10, it can be inferred that at the initial stage of the printing, the silver toner TS at small particle diameters, with a low content of the brilliant pigment and low electrical conductivity (high electric chargeability), is preferentially used (consumed). Further, in the image forming unit 10 at a later stage of the printing, it can be inferred that the silver toner TS remaining in the toner container 12, namely, the silver toner TS at large particle diameters, with a high content of the brilliant pigment and high electrical conductivity (low electric chargeability), is mainly consumed.

That is, the silver toner TS has a tendency that the silver toner TS at relatively small particle diameters is preferentially used in the stage where the value of the dot count d of the silver color is relatively small (the initial stage of the printing) and the silver toner TS at larger particle diameters is used as the dot count d increases (i.e., the later stage in the printing). Accordingly, even if constant silver toner images PS are printed on media MD by using this silver toner TS, there is a possibility that the luster varies depending on the dot count d of the silver color and a different impression is given to the user.

Therefore, in the image forming device 1 according to this embodiment, the range of variation of the FI value is held down by changing the print pattern N in the brilliant superimposition information stored in the brilliant color data conversion table 96 (i.e., in the examples X1C, X2M and X3Y shown in FIGS. 11A and 11B) depending on the increase in the dot count d of the silver color. In the following, a description will be given of the reason why the FI value varies depending on the dot count d of the silver color and the reason why the variation can be inhibited by the changing of the print pattern N.

According to the brilliant superimposition information, at the stage when the dot count d of the silver color is relatively small, one region (hereinafter referred to as a "silver toner region") is formed with a relatively small number of dots such as 4 dots and a relatively large number of the regions are arranged in the silver toner image PS as in the print pattern NC2 (FIG. 9B) and the print pattern NM3 (FIG. 10C). In these print patterns N, there exist a relatively large number of boundary parts forming outer edges of the silver toner regions.

Figure 15B:
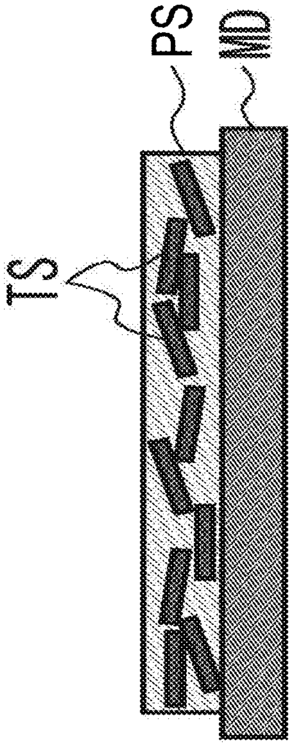
FIGS. 15A and 15B are schematic cross-sectional views showing states in which a silver toner image has been printed on the surface of a medium.
Figure 15A:
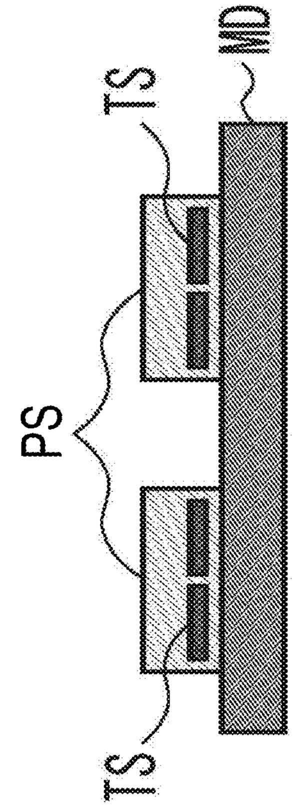

FIGS. 15A and 15B are schematic cross-sectional views showing states in which the silver toner image has been printed on the surface of a medium. FIG. 15A schematically shows a state in which a silver toner image PS has been printed on the surface of a medium. In this silver toner image PS, each silver toner region is formed relatively small, and thus the silver toner TS included in each silver toner region is likely to be spread out by the fixing process and the level of orientation (alignment) of the pigment becomes high, and consequently, the FI value tends to increase.

That is, in the image forming device 1, at the stage when the dot count d of the silver color is relatively small, although there is a danger that the FI value decreases excessively since the particles of the silver toner TS are relatively small, it is possible to inhibit the decrease in the FI value and set the FI value at an excellent value by increasing the level of orientation of the pigment by forming a large number of boundary parts in the silver toner image PS.

In contrast, according to the brilliant superimposition information, at the stage when the dot count d of the silver color is relatively large, each silver toner region is formed with a relatively large number of dots such as 12 dots or 16 dots and a relatively small number of the regions are arranged in the silver toner image PS as in the print pattern NC4 (FIG. 9D) and the print pattern NM6 (FIG. 10F). In these print patterns N, there exist a relatively small number of boundary parts forming the outer edges of the silver toner regions.

As shown in FIG. 15B in contrast to FIG. 15A, in the silver toner image PS in this case, each silver toner region is formed relatively large, and thus the level of orientation of the pigment in the silver toner TS included in each silver toner region deteriorates, and consequently, the FI value tends to decrease.

That is, in the image forming device 1, in the stage when the dot count d of the silver color is relatively large, although there is a danger that the FI value increases excessively since the particles of the silver toner TS are relatively large, it is possible to inhibit the increase in the FI value and consequently set the FI value at an excellent value by deteriorating the level of orientation of the pigment by forming a small number of boundary parts in the silver toner image PS.

Incidentally, in the fixing device 60 (FIG. 1) of the image forming device 1, heat and pressure are applied by the heating part 61 and the pressing part 62 to the toner images transferred onto the surface of the medium MD as the fixing process. Further, in cases where the medium MD is generic paper, the medium MD is composed as an aggregate of fibers, and thus the medium MD as closely observed does not necessarily have a flat surface and a certain degree of unevenness, fiber gaps and the like have been formed on the surface.

Figure 16A:
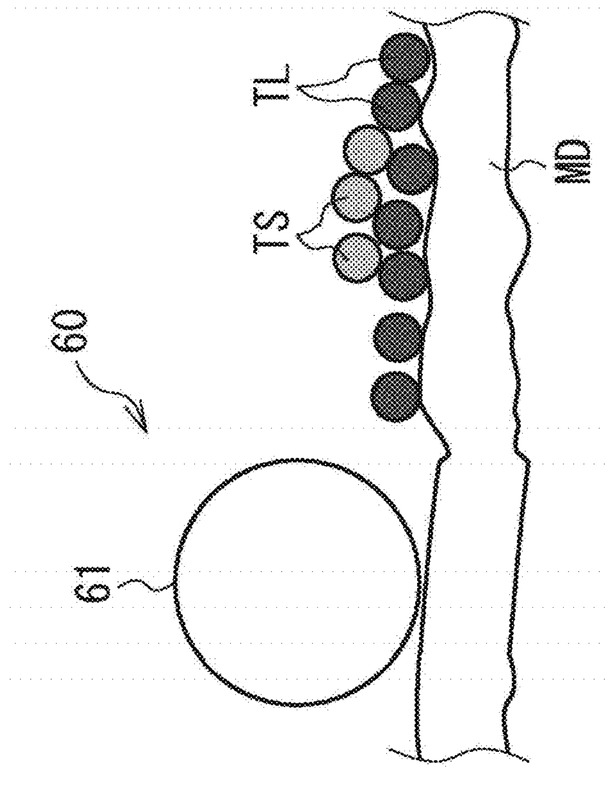
FIGS. 16A and 16B are schematic cross-sectional views showing states in which a brilliant superimposition image is fixed on a medium.
Figure 16B:
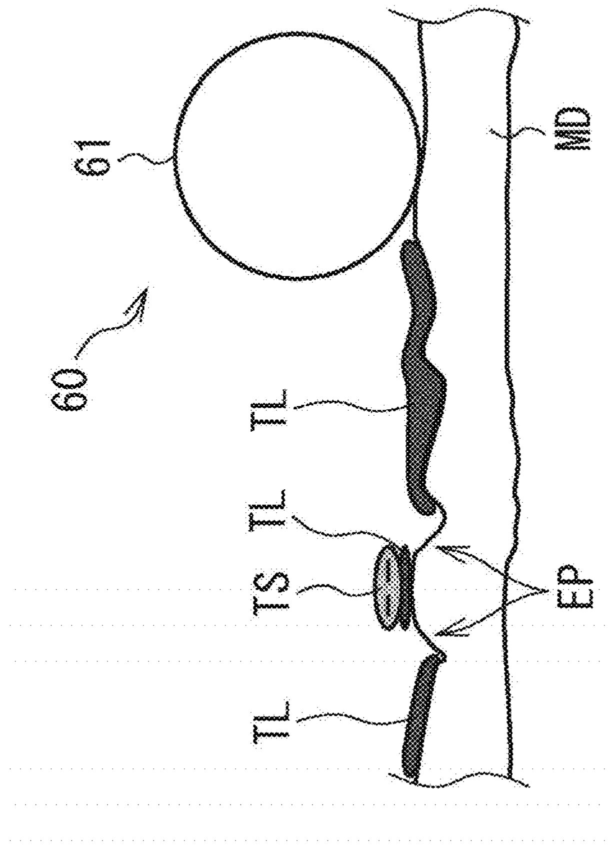

FIGS. 16A and 16B are schematic cross-sectional views showing states in which a brilliant superimposition image is fixed on a medium MD. Here, FIGS. 16A and 16B respectively show states of the fixing device 60, the medium MD, the color toner TL and the silver toner TS before and after the fixing process. As shown in FIG. 16A, on the surface of the medium MD before the fixing process, the color toner TL and the silver toner TS are piled up in a particulate state.

As shown in FIG. 16B, on the surface of the medium MD after the fixing process, in parts relatively apart from the silver toner TS, the color toner TL is fixed excellently while being spread sufficiently, being fitted with the unevenness of the medium MD, and entering the fiber gaps. However, in parts relatively close to the silver toner TS on the surface of the medium MD, it can be considered that a lot of heat is absorbed by the silver toner TS and thus the color toner TL is not spread sufficiently, is not sufficiently fitted with the unevenness of the medium MD, and is unlikely to enter the fiber gaps. Accordingly, on the surface of the medium MD, exposed parts EP where the medium MD is exposed are formed in the vicinity of the silver toner TS. Suppose that such exposed parts EP increase on the medium MD, the FI value as a whole decreases.

Therefore, in the brilliant superimposition information (i.e., in the examples X1C, X2M and X3Y), the print pattern is switched from the print pattern NM5 (FIG. 10E) to the print pattern NM6 (FIG. 10F) in the case of magenta when the dot count d of the silver color exceeds 8589 k or in the case of yellow when the dot count d of the silver color exceeds 6929 k.

Here, in the print pattern NM5, each silver toner region is relatively short in the longitudinal direction and relatively long in the transverse direction, and the ratio of the length in the longitudinal direction to the length in the transverse direction (hereinafter referred to as a "region aspect ratio") is approximately 1.33 and is slightly greater than the value "1". In contrast, in the print pattern NM6, each silver toner region is short in the longitudinal direction and sufficiently long in the transverse direction, and the region aspect ratio is 3.00, which is sufficiently greater than the value "1" and is also sufficiently greater as compared to approximately 1.33 regarding the print pattern NM5.

In the print pattern NM6, as compared to the print pattern NM5, the number of dots forming each silver toner region is 12 dots which is equivalent to that in the print pattern NM5, whereas the interval between silver toner regions in regard to the transverse direction (main scanning direction) is enlarged due to the increase in the region aspect ratio. Accordingly, on the medium MD printed with the print pattern NM6, as compared to the medium MD printed with the print pattern NM5, the amount of the color toner TL situated in the vicinity of one silver toner region increases and the ratio of the exposure of the medium MD increases, and thus the increase can lead to a decrease in the FI value. On the other hand, in regard to the silver toner TS, as mentioned earlier, the particles become relatively large with the increase in the dot count d, and consequently, the FI value in the silver toner image PS can increase excessively.

That is, in the image forming device 1, although there is the danger that the FI value increases excessively in magenta and yellow with the increase in the dot count d of the silver color, the increase in the FI value is inhibited by switching the print pattern N from the print pattern NM5 to the print pattern NM6, by which the variation in the FI value can be inhibited overall and approximately constant luster can be maintained.

Further, in the image forming device 1, the ranges of variation of the C* value and the "C* retention rate" can also be held down by changing the print pattern N in the brilliant superimposition information (i.e., in the examples X1C, X2M and X3Y) stored in the brilliant color data conversion table 96 depending on the increase in the dot count d of the silver color.

That is, in the image forming device 1, as the particle diameter of the silver toner TS increases with the increase in the dot count d of the silver color, the area of exposure of the color toner TL decreases on the surface of the medium MD and thus the C* value decreases. Therefore, in the image forming device 1, with the increase in the dot count d, the print pattern N is changed stepwise and the number of dots forming the silver toner region is increased gradually.

In this case, in the brilliant superimposition image PV printed by the image forming device 1, the number of dots in a range where color toners adjoin each other in each print pattern N also increases, and thus each part where the color toner TL is exposed is enlarged and that works in a direction of increasing the C* value. As a result, in the image forming device 1, even with the increase in the dot count d of the silver color, the variations of the C* value and the "C* retention rate" in the brilliant superimposition image PV can be inhibited excellently and satisfactory saturation can be maintained.

Incidentally, it can be considered that cyan has low saturation in the single color (FIG. 8) as compared to magenta and yellow and has a relatively similar color tone as compared to the silver color. In consideration of such relationships, in the image forming device 1, each silver toner region is formed in a rectangular shape being long in the longitudinal direction in the print patterns NC2-NC4 (FIGS. 9B to 9D) used when the silver toner image is superimposed on cyan. Accordingly, on the medium MD printed with the image in the print pattern NC2 or the like, the image forming device 1 is capable of achieving sufficient brilliance and saturation without making the user overly aware of fine lines in the longitudinal direction due to the silver toner regions.

Further, in the brilliant superimposition information (i.e., in the examples X1C, X2M and X3Y), in the print patterns NM5 and NM6 used when the silver toner image is superimposed on magenta or yellow, the silver toner regions are arranged to adjoin each other in a diagonal direction and linearly overall in the diagonal direction. Accordingly, on the medium MD printed with the image in the print pattern NC5 or the like, the image forming device 1 is capable of slightly extending the interval between silver toner regions compared to the case of cyan and achieving sufficient brilliance and saturation without making the user overly aware of fine lines in the diagonal direction due to the silver toner regions.

Furthermore, when the brilliant superimposition image PV is printed on the medium MD by the image forming device 1, it is only necessary on the host device 100 to designate the image density uniformly at 100% throughout the entire range in regard to the silver toner image PS to be superimposed on the color toner image PL. That is, the image forming device 1 does not need to make the user carry out troublesome work, such as dividing the image into parts of respective colors and varying the image density of the silver toner image PS from part to part, for example.

With the configuration described above, when the brilliant superimposition part is included in the print data received from the host device 100, the image forming device 1 according to this embodiment executes the printing on the medium MD by changing the print pattern N of the silver toner image PS in the brilliant superimposition part. In this case, the image forming device 1 sets the image density of the superimposed silver toner image PS at relatively high density for a color whose saturation in the single color is relatively low, sets the image density of the superimposed silver toner image PS at relatively low density for a color whose saturation in the single color is relatively high, and changes the print pattern N to the print pattern N corresponding to the dot count d of the silver color. Accordingly, the image forming device 1 is capable of making each of the FI value and the "C* retention rate" take on values relatively close to each other in colors different from each other and obtaining an excellent image in which uniform luster is exhibited while retaining the tint of the original image as a whole.

6. Other Embodiments

Incidentally, in the above-described embodiment, a description is given of a mode in which the print pattern N in the brilliant superimposition image PV is switched depending on the dot count d of the silver color (FIGS. 9B to 9D, FIGS. 10C to 10F, and FIGS. 11A and 11B) on the assumption that the silver toner TS in the toner container 12 of the silver color is used preferentially from the silver toner TS at relatively small particle diameters (TS in FIG. 16A). However, the present disclosure is not limited to such cases and it is also possible, for example, to use a constant print pattern N for each color irrespective of the dot count d of the silver color in cases where the range of variation of the particle size of the silver toner TS depending on the dot count d is sufficiently small or the like. Specifically, it is possible, for example, to use the print pattern NC2 (FIG. 9B) for cyan and use the print pattern NM3 (FIG. 10C) for magenta and yellow irrespective of the dot count d of the silver color.

In the above-described embodiment, a description is given of a mode in which the size of each print pattern N (i.e., the number of dots forming one print pattern N: 16 dots, 36 dots, 192 dots and 192 dots in the print patterns NM3-NM6) is increased with the increase in the dot count d of the silver color (FIGS. 11A and 11B) in regard to the print patterns NM3-NM6 (FIGS. 10C to 10F) of magenta and yellow in the brilliant superimposition information (i.e., in the examples X1C, X2M and X3Y). However, the present disclosure is not limited to such cases and it is also possible, for example, to change the shape and arrangement of each silver toner region while maintaining the size of the print pattern N constant when the dot count d of the silver color increases.

In the above-described embodiment, a description is given of a mode in which the size of the entire region is maintained and the transverse direction length of the small region is successively extended while maintaining the longitudinal direction length of the small region as the print pattern N regarding cyan in the brilliant superimposition information is successively switched to the print patterns NC2, NC3 and NC4 with the increase in the dot count d of the silver color (FIGS. 9B to 9D and FIGS. 11A and 11B). However, the present disclosure is not limited to such cases and it is also possible, for example, to reduce the transverse direction length of the small region while maintaining the longitudinal direction length of the small region, extend or reduce the longitudinal direction length while maintaining the transverse direction length, extend or reduce both of the longitudinal direction length and the transverse direction length, or appropriately combine some of these methods. Further, it is also possible, for example, to extend or reduce at least one of the longitudinal direction length and the transverse direction length of the entire region.

In the above-described embodiment, a description is given of a mode in which both of the entire region and the small region are reduced in the longitudinal direction length and extended in the transverse direction length to be flattened to be long in the transverse direction when the print pattern N regarding magenta and yellow in the brilliant superimposition information is switched from the print pattern NM5 to the print pattern NM6 with the increase in the dot count d of the silver color (FIGS. 10A to 10F and FIGS. 11A and 11B). However, the present disclosure is not limited to such cases and it is also permissible, for example, even if both of the entire region and the small region are reduced in the transverse direction length and extended in the longitudinal direction length to be flattened to be long in the longitudinal direction. Further, it is also possible, for example, to extend or reduce at least one of the longitudinal direction size and the transverse direction size of the small region while maintaining the size of the entire region. Furthermore, it is also possible, for example, to extend or reduce at least one of the longitudinal direction size and the transverse direction size of the entire region while maintaining the size of the small region.

In the above-described embodiment, a description is given of a mode in which the entire region is divided into small regions respectively in a rectangular shape being long in the longitudinal direction (i.e., the auxiliary scanning direction) and the silver toner is arranged in some of the small regions in the print patterns NC2 and NC3 (FIGS. 9B and 9C) of cyan in the brilliant superimposition information. However, the present disclosure is not limited to such cases and it is also possible, for example, to divide the entire region into small regions respectively in a rectangular shape being long in the transverse direction (i.e., the main scanning direction) and arrange the silver toner in some of the small regions. Further, it is also possible, for example, to divide the entire region in a grid and arrange the silver toner linearly overall in a diagonal direction as in the print patterns NM5 and NM6 (FIGS. 10E and 10F). Furthermore, it is also possible, for example, to divide the entire region into a large number of relatively small regions in a grid and arrange the silver toner so as to form halftone dots.

In the above-described embodiment, a description is given of a mode in which the entire region is divided into two in the longitudinal direction and the transverse direction to form four small regions and the silver toner is arranged in only one of the four small regions in the print patterns NM3 and NM4 (FIGS. 10C and 10D) of magenta and yellow in the brilliant superimposition information. However, the present disclosure is not limited to such cases and it is also possible, for example, to divide the entire region into a larger number of small regions in a grid and arrange the silver toner linearly overall in a diagonal direction or arrange the silver toner so as to form halftone dots as in the print patterns NM5 and NM6 (FIGS. 10E and 10F).

In the above-described embodiment, a description is given of a mode in which the entire region is divided into small regions in a grid and the silver toner is arranged in some of the small regions to be linear overall in a diagonal direction in the print patterns NM5 and NM6 (FIGS. 10E and 10F) of magenta and yellow in the brilliant superimposition information. However, the present disclosure is not limited to such cases and it is also possible, for example, to divide the entire region into small regions respectively in a rectangular shape being long in the longitudinal direction (i.e., the auxiliary scanning direction) or divide the entire region into small regions respectively in a rectangular shape being long in the transverse direction (i.e., the main scanning direction) and arrange the silver toner in some of the small regions as in the print patterns NC2 and NC3 (FIGS. 9B and 9C) of cyan in the brilliant superimposition information. Further, it is also possible, for example, to divide the entire region into a large number of relatively small regions in a grid and arrange the silver toner so as to form halftone dots.

In the above-described embodiment, a description is given of a mode in which the silver toner image PS is superimposed on the color toner image PL on the surface of the medium MD when forming the brilliant superimposition image PV (FIGS. 9A to 9D). However, the present disclosure is not limited to such cases and it is also possible, for example, to form the brilliant superimposition image PV by superimposing the color toner image PL on the silver toner image PS on the surface of the medium MD, that is, by reversing the stacking order of the color toner image PL and the silver toner image PS.

In the above-described embodiment, a description is given of a mode in which the image density of the silver toner image PS, in the brilliant superimposition image PV formed by superimposing the silver toner image PS on the color toner image PL with a single color: cyan, magenta or yellow, is reduced by changing the silver toner image PS to the print pattern N corresponding to the color according to the brilliant superimposition information. However, the present disclosure is not limited to such cases, and when the color toner image PL includes a part in red (red color) as a mixture of magenta and yellow, for example, it is also possible to change the silver toner image PS to a print pattern N corresponding to the most dominant color out of magenta and yellow forming the part.

In the above-described embodiment, a description is given of a mode in which the image density of the silver toner image PS (i.e., the brilliant image) is changed depending on the color gamut (C*) of the color toner TL (i.e., the color toner image PL) printed on the medium MD. However, the present disclosure is not limited to such cases and it is also possible, for example, to change the image density of the silver toner image PS depending on the color gamut of the color toner TL in the powdery state before the printing.

FIG. 17 is a diagram showing the color gamut of the toner of each color in the powdery state in tabular form. In regard to the color toners TL used in the embodiment, the color gamut (L*, a*, b* and C*) of each color toner TL in the powdery state before the printing takes on the values shown in the table TBL10 in FIG. 17, for example. Thus, it is also possible, for example, to previously store the brilliant color data conversion table 96 (FIG. 3) generated based on the table TBL10 in FIG. 17 in the storage section 81 and execute the brilliant superimposition image print process in the same way as in the embodiment.

Incidentally, powder hues shown in the table TBL10 in FIG. 17 were measured by using a spectrocolorimeter SE-2000 (manufactured by Nippon Denshoku Industries Co., Ltd.) and employing a C light source, a 2 [°] visual field and a reflection setting. Specifically, 3.0 [g] of the toner T of each color was filled into a powder measurement cell in a cylindrical shape (thickness: 2 [mm], diameter: 30 [mm]) as an accessory to the spectrocolorimeter, the filling density is increased by vibrating the powder measurement cell in the gravity direction at a rate of 1 [time/second] for 30 seconds, and L*, a* and b* as the powder hues in the powdery state were respectively measured. Further, the color gamut (C*) of the toner T was calculated by applying the measured values of the powder hues to the aforementioned expression (1).

In the above-described embodiment, a description is given of a mode in which the brilliant superimposition information is previously stored in the brilliant color data conversion table 96 (FIG. 3) provided in the storage section 81 of the image forming device 1 and the print pattern N of the brilliant superimposition part is changed in the step SP5 of the procedure RT1 (FIG. 14) of the brilliant superimposition image print process executed by the control section 3. However, the present disclosure is not limited to such cases and it is also possible, for example, to previously store the brilliant superimposition information in the host device 100 and make the printer driver refer to the brilliant superimposition information, generate print data in which the print pattern N of the brilliant superimposition part has been changed, and transmit the print data to the image forming device 1. In this case, the control section 3 of the image forming device 1 may directly form and print the color toner images PL and the silver toner image PS without the need of changing the print pattern of the brilliant superimposition part.

In the above-described embodiment, a description is given of a mode in which if a silver toner image PS with the image density of 100% is superimposed on a color toner image PL in the print data received from the host device 100, the control section 3 of the image forming device 1 regards the image represented by the print data as a brilliant superimposition image PV and changes the print pattern N. However, the present disclosure is not limited to such cases and it is also possible, for example, to make the control section 3 regard the image as a brilliant superimposition image PV and change the print pattern N if silver toner images PS with various image densities are superimposed on a color toner image PL in the print data. Further, it is also possible, for example, to make the control section 3 regard the image as a brilliant superimposition image PV and change the print pattern N if a command for superimposing a silver toner image PS on a color toner image PL has been described in a variety of printing language or the like.

In the above-described embodiment, a description is given of a mode in which the toner T of the silver color (silver toner TS) is used as the toner T having the brilliance. However, the present disclosure is not limited to such cases and it is also possible, for example, to use a toner T of a variety of color having the brilliance, such as gold color or copper color. For example, the toner T of the gold color can be manufactured by partially modifying the manufacturing process of the silver toner TS described in the embodiment. Specifically, the toner T of the gold color can be manufactured by adding a yellow pigment (e.g., C. I. Pigment Yellow 180 as an organic pigment), a magenta pigment (e.g., C. I. Pigment Red 122 as an organic pigment), a red-orange color fluorescent dye (e.g., FM-34N_Orange (manufactured by Sinloihi Co., Ltd.)) and a yellow color fluorescent dye (e.g., FM-35N_Yellow (manufactured by Sinloihi Co., Ltd.)) when adding aluminum powder as the brilliant pigment. Further, as the brilliant pigment, not only aluminum (Al) but also various other pigments having the brilliance may be used, such as an inorganic pigment made with a pearl pigment (natural mica (mica)) and titanium oxide, for example.

In the above-described embodiment, a description is given of a case where the image forming device 1 (FIG. 1) is provided with five image forming units 10. However, the present disclosure is not limited to such cases and it is also possible to provide the image forming device 1 with four or less or six or more image forming units 10.

In the above-described embodiment, a description is given of a mode in which the image forming device (FIG. 1) employs the so-called intermediate transfer method, the toner images formed in the respective image forming units 10 are primarily transferred onto the intermediate transfer belt 34, and the toner images are secondarily transferred from the intermediate transfer belt 34 onto the medium MD. However, the present disclosure is not limited to such cases and it is also possible, for example, to configure the image forming device to employ the so-called direct transfer method and transfer the toner images formed in the respective image forming units 10 directly onto the medium MD.

In the above-described embodiment, a description is given of a case where the present disclosure is applied to an image forming device 1 that forms an image by using developing agents used for a single component development method. However, the present disclosure is not limited to such cases and it is also possible to apply the present disclosure to an image forming device that forms an image by using developing agents used for a two-component development method as a method in which a carrier and a toner are mixed together and the toner is provided with an appropriate amount of electrification by using friction between the carrier and the toner. Incidentally, when a description is given in terms of the two-component development method, particles including a brilliant pigment, a binder resin and an external additive, or powdery matter as an aggregate of the particles, are/is defined as the brilliant toner or the brilliant developing agent.

In the above-described embodiment, a description is given of a case where the present disclosure is applied to an image forming device 1 being a single function printer. However, the present disclosure is not limited to such cases but is applicable also to an image forming device having various other functions such as an MFP (Multi-Function Peripheral) having the functions of a copy machine and a facsimile machine, for example.

The present disclosure is not limited to the embodiment and other embodiments described above. That is, the scope of application of the present disclosure ranges also to embodiments obtained by arbitrarily combining part or all of the above-described embodiment and part or all of the above-described other embodiments. Further, the scope of application of the present disclosure ranges also to embodiments obtained by extracting a part of a configuration described in an arbitrary embodiment among the above-described embodiment and other embodiments and substituting/diverting the extracted part of the configuration for/to a part of the configuration of an arbitrary embodiment among the above-described embodiment and other embodiments or adding the extracted part of the configuration to an arbitrary embodiment.

In the above-described embodiment, a description is given of a mode in which the image forming device 1 as the image forming device is formed with the image forming unit 10S as the brilliant image forming section, the image forming units 10K, 10C, 10M and 10Y as the non-brilliant image forming sections, and the control section 3 as the control section. However, the present disclosure is not limited to such cases and it is also possible to form the image forming device with a brilliant image forming section, non-brilliant image forming sections and a control section having various other configurations.

The present disclosure is applicable to cases where an image is formed on a medium by the electrophotographic method by using a non-brilliant developing agent and a brilliant developing agent.

7. Description of Reference Characters

1: image forming device, 3: control section, 10: image forming unit, 10K, 10C, 10M, 10Y: image forming unit (non-brilliant image forming section), 10S: image forming unit (brilliant image forming section), 12: toner container (developing agent container, brilliant developing agent container), 34: intermediate transfer belt, 60: fixing device, 80: print control section, 81: storage section, 95: normal color data conversion table, 96: brilliant color data conversion table, 97: condition information table, 100: host device, D: image density, MD: medium, N, NC1, NC2, NC3, NC4, NM1, NM2, NM3, NM4, NM5, NM6: print pattern (arrangement pattern), PL: color toner image (non-brilliant image), PS: silver toner image (brilliant image), PV: brilliant superimposition image, T: toner (developing agent), TL: color toner (non-brilliant developing agent), TS: silver toner (brilliant developing agent), d: dot count (post-replacement use amount).

What is claimed is:

1. An image forming device for forming an image corresponding to print data, the device comprising:
- a control section configured to
  - analyze the print data to determine a brilliant image and a non-brilliant image for forming the image, the brilliant image including a plurality of portions each having an image density designated by the print data, the non-brilliant image including a plurality of portions each having a saturation, the plurality of portions of the non-brilliant image corresponding respectively to the plurality of portions of the brilliant image, and
  - determine the image density of each of the plurality of portions of the brilliant image, and
    - responsive to the image density of said each portion being designated by the print data to be 100%:
      - determine the saturation of one of the plurality of portions of the non-brilliant image corresponding to said each portion, and
      - reduce the image density of said each portion
        - to a first image density if the determined saturation is a first saturation, and
        - to a second image density lower than the first image density if the determined saturation is a second saturation higher than the first saturation;
- a brilliant image forming section configured to print the brilliant image using a brilliant developing agent onto a medium; and
- a non-brilliant image forming section configured to print the non-brilliant image using a non-brilliant developing agent onto the medium, wherein
- the control section is further configured to
  - control the non-brilliant image forming section and the brilliant image forming section, so that the printed brilliant image is superimposed on the printed non-brilliant image,
- the brilliant developing agent includes a plurality of dots in an arrangement pattern, and the image density of the brilliant image is changed by changing the arrangement pattern of the plurality of dots,
- the image forming device further includes a brilliant developing agent container configured to be replaceable in the brilliant image forming section and to store the brilliant developing agent to be used for forming the brilliant image, and
- the control section changes the arrangement pattern of the plurality of dots depending on a post-replacement use amount, which is an amount of use of the brilliant developing agent after a time point of replacement of the brilliant developing agent container in the brilliant image forming section.

2. The image forming device according to claim 1, wherein the control section enlarges a range of each region where the brilliant developing agent is arranged in a part with the first image density in the brilliant image with an increase in the post-replacement use amount, in regard to at least one of a main scanning direction and an auxiliary scanning direction orthogonal to the main scanning direction in the brilliant image forming section.

3. The image forming device according to claim 2, wherein the control section repeatedly arranges small regions, whose numbers of dots in the main scanning direction and the auxiliary scanning direction are respectively a main scanning dot number and an auxiliary scanning dot number, like a grid and increases at least one of the main scanning dot number and the auxiliary scanning dot number with the increase in the post-replacement use amount in the part with the first image density in the brilliant image.

4. The image forming device according to claim 3, wherein the control section changes a ratio between the main scanning dot number and the auxiliary scanning dot number with a change in the post-replacement use amount in the part with the first image density in the brilliant image.

5. The image forming device according to claim 1, wherein the control section changes the arrangement pattern of the plurality of dots to use the brilliant developing agent in a diagonal direction, which is different from either of a main scanning direction and an auxiliary scanning direction orthogonal to the main scanning direction.

6. The image forming device according to claim 1, wherein the control section changes the arrangement pattern of the plurality of dots to use the brilliant developing agent in a diagonal direction different from either of a main scanning direction and an auxiliary scanning direction orthogonal to the main scanning direction in the brilliant image forming section in a part where the non-brilliant image has the second saturation.

7. The image forming device according to claim 1, wherein the control section changes the arrangement pattern of the plurality of dots to use the brilliant developing agent in a main scanning direction or an auxiliary scanning direction orthogonal to the main scanning direction in the brilliant image forming section in a part where the non-brilliant image has the first saturation.

8. The image forming device according to claim 1, further comprising a fixing device that fixes the brilliant image and the non-brilliant image formed on the medium to the medium.

9. An image forming device for forming an image corresponding to print data, the device comprising:
a control section configured to
analyze the print data to determine a brilliant image and a non-brilliant image for forming the image, the brilliant image including a plurality of portions each having an image density designated by the print data, the non-brilliant image including a plurality of portions each having a saturation, the plurality of portions of the non-brilliant image corresponding respectively to the plurality of portions of the brilliant image, and
determine the image density of each of the plurality of portions of the brilliant image, and
responsive to the image density of said each portion being designated by the print data to be 100%:
determine the saturation of one of the plurality of portions of the non-brilliant image corresponding to said each portion, and
reduce the image density of said each portion
to a first image density if the determined saturation is a first saturation, and
to a second image density lower than the first image density if the determined saturation is a second saturation higher than the first saturation;
a brilliant image forming section configured to print the brilliant image out using a brilliant developing agent on a medium; and
a non-brilliant image forming section configured to print the non-brilliant image out using a non-brilliant developing agent on the medium, wherein
the control section is further configured to
control the non-brilliant image forming section and the brilliant image forming section, so that the printed brilliant image is superimposed on the printed non-brilliant image,
the brilliant developing agent includes a plurality of dots in an arrangement pattern, and the image density of the brilliant image is changed by changing the arrangement pattern of the plurality of dots,
the image forming device further includes a brilliant developing agent container configured to be replaceable in the brilliant image forming section and to store the brilliant developing agent to be used for forming the brilliant image, and
the control section sets the second image density so that a difference in an index value representing a degree of brilliance between the non-brilliant image with the first saturation on which the brilliant image with the first image density has been superimposed and the non-brilliant image with the second saturation on which the brilliant image with the second image density has been superimposed is in a predetermined range and a ratio of a change in the saturation when a post-replacement use amount as an amount of use of the brilliant developing agent after a time point of replacement of the brilliant developing agent container in the brilliant image forming section has changed is in a predetermined range.

10. The image forming device according to claim 9, wherein the second image density is higher than or equal to 23% and lower than or equal to 44%.

11. An image forming method for forming an image corresponding to print data, the method comprising:
analyzing the print data to determine a brilliant image and a non-brilliant image for forming the image, the brilliant image including a plurality of portions each having an image density designated by the print data, the non-brilliant image including a plurality of portions each having a saturation, the plurality of portions of the non-brilliant image corresponding respectively to the plurality of portions of the brilliant image; and
determining the image density of each of the plurality of portions of the brilliant image, and
responsive to the image density of said each portion being designated by the print data to be 100%:
determining the saturation of one of the plurality of portions of the non-brilliant image corresponding to said each portion; and
reducing the image density of said each portion
to a first image density if the determined saturation is a first saturation, and
to a second image density lower than the first image density if the determined saturation is a second saturation higher than the first saturation;
printing the non-brilliant image onto a medium using a non-brilliant developing agent; and
printing the brilliant image with the reduced image density onto the medium using a brilliant developing agent, to be superimposed on the formed non-brilliant image, wherein
the brilliant developing agent includes a plurality of dots in an arrangement pattern, and the image density of the brilliant image is changed by changing the arrangement pattern of the plurality of dots, and
the image forming method further includes changing the arrangement pattern of the plurality of dots depending on a post-replacement use amount, which is an amount of use of the brilliant developing agent after a time point of replacement of a brilliant developing agent container.

* * * * *